(12) United States Patent
Sawa et al.

(10) Patent No.: US 11,884,143 B2
(45) Date of Patent: Jan. 30, 2024

(54) REINFORCING STRUCTURE OF AUTOMOBILE EXTERIOR PANEL

(71) Applicant: NIPPON STEEL CORPORATION, Tokyo (JP)

(72) Inventors: Yasunori Sawa, Tokyo (JP); Toshiya Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 30 days.

(21) Appl. No.: 17/634,819

(22) PCT Filed: Sep. 14, 2020

(86) PCT No.: PCT/JP2020/034789
§ 371 (c)(1),
(2) Date: Feb. 11, 2022

(87) PCT Pub. No.: WO2021/049670
PCT Pub. Date: Mar. 18, 2021

(65) Prior Publication Data
US 2022/0324307 A1     Oct. 13, 2022

(30) Foreign Application Priority Data

Sep. 13, 2019   (JP) .................................. 2019-167395

(51) Int. Cl.
*B60J 5/04*            (2006.01)
(52) U.S. Cl.
CPC .................................. *B60J 5/0455* (2013.01)

(58) Field of Classification Search
CPC ...... B60J 5/0455; B60J 5/0441; B60J 5/0443; B60J 5/0444; B60J 5/0451; B60J 5/0458;
(Continued)

(56) References Cited

U.S. PATENT DOCUMENTS

| 5,542,738 A | 8/1996 | Walker et al. |
| 6,672,654 B2 * | 1/2004 | Yamada .................... F16F 7/12 |
| | | 296/203.02 |

(Continued)

FOREIGN PATENT DOCUMENTS

| JP | 10-100674 A | 4/1998 |
| JP | 10-250369 A | 9/1998 |

(Continued)

*Primary Examiner* — Amy R Weisberg
*Assistant Examiner* — Veronica M Shull
(74) *Attorney, Agent, or Firm* — Birch, Stewart, Kolasch & Birch, LLP

(57) ABSTRACT

A reinforcing structure of an automobile exterior panel improving performance in absorbing an impact load, the reinforcing structure of an automobile exterior panel comprising an outer panel 110 of a sheet shape, a reinforcing member 120 arranged at a vehicle inner side from the outer panel 110, an inner panel 135 of a sheet shape arranged at a vehicle inner side from the reinforcing member 120, and a support member 140 provided at a vehicle outer side from the inner panel 135 and supporting the reinforcing member 120 from a vehicle inner side, the support member 140 comprised of tube-shaped member having axial centers directed from the vehicle inner side toward the vehicle outer side.

11 Claims, 19 Drawing Sheets

(58) Field of Classification Search
CPC ........ B60J 5/0413; B60J 5/042; B60J 5/0422;
B60J 5/0437
USPC .................................................. 296/146.6
See application file for complete search history.

(56) References Cited

U.S. PATENT DOCUMENTS

| | | | |
|---|---|---|---|
| 2006/0033361 A1* | 2/2006 | Frederick | B62D 25/00 296/187.01 |
| 2013/0187396 A1* | 7/2013 | Brockhoff | B60R 19/24 293/146 |
| 2015/0123423 A1* | 5/2015 | Hasegawa | F16F 7/121 296/146.6 |
| 2016/0244100 A1 | 8/2016 | Hasegawa et al. | |
| 2019/0168587 A1 | 6/2019 | Suzuki et al. | |

FOREIGN PATENT DOCUMENTS

| | | | |
|---|---|---|---|
| JP | 3013921 B2 | | 2/2000 |
| JP | 3403276 B2 | | 5/2003 |
| JP | 2004-360790 A | | 12/2004 |
| JP | 2008-87741 A | | 4/2008 |
| JP | 2008087741 A | * | 4/2008 |
| JP | 2009-6838 A | | 1/2009 |
| JP | 4259519 B2 | | 4/2009 |
| JP | 2016-153292 A | | 8/2016 |
| JP | 2017-77759 A | | 4/2017 |
| JP | 2018-24270 A | | 2/2018 |
| WO | WO 2018/021422 A1 | | 2/2018 |

* cited by examiner

REINFORCING STRUCTURE OF AUTOMOBILE EXTERIOR PANEL

FIELD

The present invention relates to a reinforcing structure of an automobile exterior panel.

BACKGROUND

Known in the past has been a support member relating to a door for a vehicle, provided at a position between the two end parts of a side impact beam, and coupled to an inner panel and supported by one surface of the inner panel (for example, see PTL 1).

CITATIONS LIST

Patent Literature

[PTL 1] Japanese Patent No. 4259519

SUMMARY

Technical Problem

According to the art described in the above PTL 1, the side impact beam is supported by a cross-sectional hat shaped support member to try to improve the impact resistance performance. However, with a cross-sectional hat shaped support member, structurally the load is received by the vertical walls, so when an impact load is applied, the support member easily deforms in a specific direction and the impact load cannot be efficiently absorbed. For this reason, there is room for improvement in the impact resistance performance.

Therefore, the present invention has as its object to provide a reinforcing structure of an automobile exterior panel improving the performance in absorption of an impact load.

Solution to Problem

The gist of the present disclosure is as follows:

(1) A reinforcing structure of an automobile exterior panel comprising an outer panel of a sheet shape, a reinforcing member arranged at a vehicle inner side from the outer panel, an inner panel of a sheet shape arranged at a vehicle inner side from the reinforcing member, and a support member provided at a vehicle outer side from the inner panel and supporting the reinforcing member from a vehicle inner side, the support member comprised of tube-shaped member having axial center directed from the vehicle inner side toward the vehicle outer side.

(2) The reinforcing structure of an automobile exterior panel according to (1), wherein the tube-shaped member has cylindrical part.

(3) The reinforcing structure of an automobile exterior panel according to (1), wherein the tube-shaped member has polygonal tube-shaped part.

(4) The reinforcing structure of an automobile exterior panel according to (3), wherein the tube-shaped member has polygonal tube-shaped part of hexagonal shapes.

(5) The reinforcing structure of an automobile exterior panel according to any one of (1) to (4), wherein the support member has partition member extending in a direction of the axial center and partitioning the tube-shaped member into pluralities of sections.

(6) The reinforcing structure of an automobile exterior panel according to (5), wherein the support member has a plurality of the partition members, and at least two of the plurality of the partition members are arranged so as to cross inside the tube-shaped member.

(7) The reinforcing structure of an automobile exterior panel according to any one of (1) to (6), wherein the support member has facing surface provided at end part at the reinforcing member side and facing the reinforcing member.

(8) The reinforcing structure of an automobile exterior panel according to (7), wherein the facing surface extend toward axial center of the tube-shaped member.

(9) The reinforcing structure of an automobile exterior panel according to any one of (1) to (8), wherein the support member has flange provided at end part at the inner panel side and fixed to the inner panel.

(10) The reinforcing structure of an automobile exterior panel according to any one of (1) to (9), wherein there are a plurality of the support members.

(11) The reinforcing structure of an automobile exterior panel according to any one of (1) to (10), wherein the reinforcing member comprises a plurality of first members of long shapes extending in a first direction running along the outer panel and a plurality of second members of long shapes extending in a second direction running along the outer panel and crossing the first members.

(12) The reinforcing structure of an automobile exterior panel according to (11), wherein the second members are thicker than the first members, and the support member support the first members or the second member at crossing part where the first members and the second members cross.

(13) The reinforcing structure of an automobile exterior panel according to (12), wherein end part of the support member at the reinforcing member side is provided with recessed part corresponding to the first members and the second members at the crossing part.

(14) The reinforcing structure of an automobile exterior panel according to (11), wherein the second members are thicker than the first members, and the support member support the second member between adjoining crossing parts among a plurality of the crossing parts where the first members and the second members cross.

(15) The reinforcing structure of an automobile exterior panel according to (14), wherein end part of the support member at the reinforcing member side is provided with recessed part corresponding to shapes of the second members between adjoining crossing parts.

(16) The reinforcing structure of an automobile exterior panel according to any one of (11) to (15), wherein the outer panel is an outer panel at a door of an automobile, and the first members extend in a vehicle height direction and the second members extend in a vehicle length direction.

(17) The reinforcing structure of an automobile exterior panel according to (16), wherein the support member has first support members with end parts at a vehicle outer side fixed to the first members or the second members and second support members with end parts at a vehicle inner side fixed to the inner panel, and the first support members and the second support members are separated from each other so that a gap is formed for window glass provided at the door to enter.

(18) The reinforcing structure of an automobile exterior panel according to any one of (1) to (17), wherein maximum widths of end part of the support member at the reinforcing member side when viewing the support member from a vehicle outer side is larger than widths of the reinforcing member.

(19) The reinforcing structure of an automobile exterior panel according to (18), wherein maximum widths of end part of the support member at the reinforcing member side when viewing the support member from a vehicle outer side is 2 times or more of the widths of the reinforcing member.

Advantageous Effects of Invention

The reinforcing structure of an automobile exterior panel according to the present invention exhibits the advantageous effect that it is possible to improve the performance in absorption of impact loads.

DESCRIPTION OF EMBODIMENTS

Figure 1:
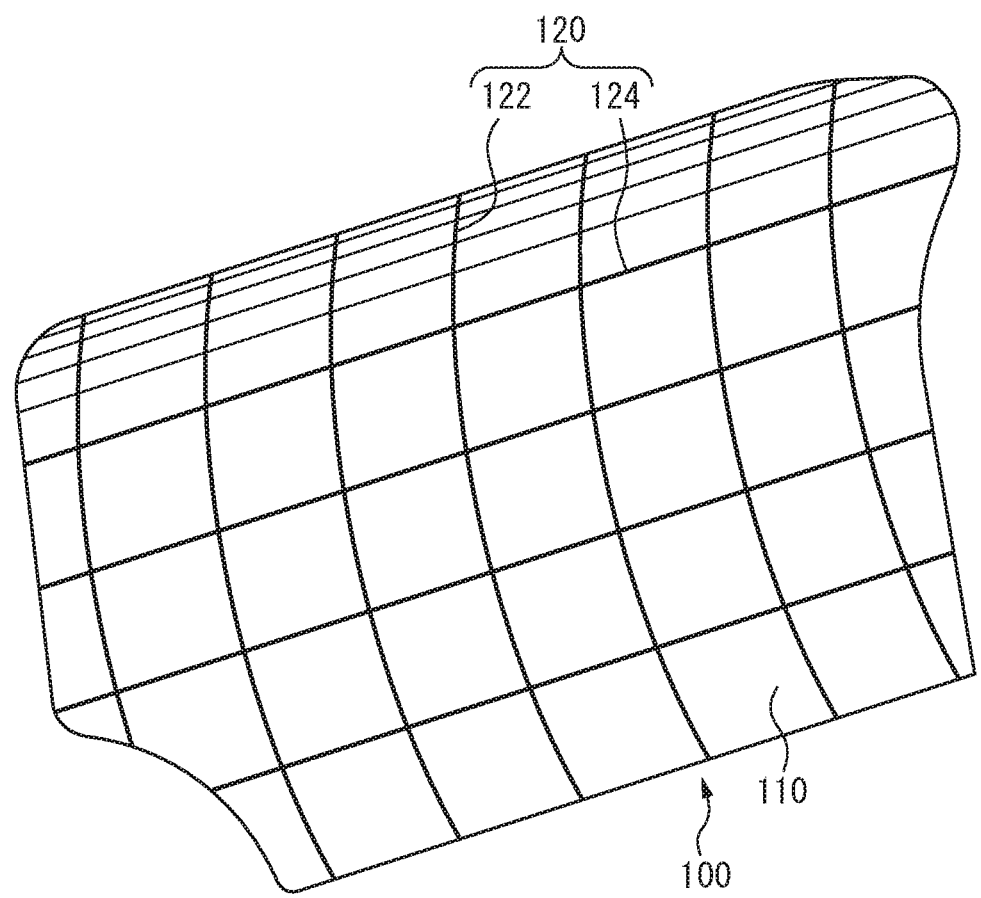
FIG. 1 is a schematic view showing an inside of an exterior panel of an automobile according to one embodiment in a state seen from a back side (vehicle inner side of automobile).

First, referring to FIG. 1, the configuration of an exterior panel of an automobile according to one embodiment of the present invention will be explained. FIG. 1 is a schematic view showing an inside of an exterior panel 100 of an automobile according to one embodiment in a state seen from a back side (vehicle inner side of automobile). Here, a door panel is illustrated as the exterior panel 100, but the exterior panel 100 may also be a panel of a fender, hood, roof, rear gate, or other member of an automobile.

As shown in FIG. 1, the exterior panel 100 has an outer panel (exterior material) 110 and reinforcing members 120. The outer panel 110 is comprised from a steel sheet of a thickness of 0.4 mm or so as one example. The outer panel 110 is curved so that its front side (vehicle outer side of automobile) becomes a convex surface. Further, the curvature of the curve runs along the vertical direction.

The reinforcing members 120 include first reinforcing members 122 of long shapes arranged in the vertical direction and second reinforcing members 124 of long shapes arranged in the horizontal direction. Note that, a "long shape" means a shape having a length extending in a predetermined direction and in particular means a shape extending in a predetermined direction by a length larger than a maximum value of an external dimension of a cross-section perpendicular to that predetermined direction. Further, the first reinforcing members 122 and the second reinforcing members 124 are all long shapes, but need not be configured from single members across the entire regions in the vertical direction or horizontal direction. For example, the first reinforcing members 122 or second reinforcing members 124 may also be comprised from pluralities of members of long shapes split at the positions of crossing parts C where the two cross. The first reinforcing members 122 are preferably curved matching the curvature of the outer panel 110. The second reinforcing members 124 extend substantially straight, but if the outer panel 110 is curved, they are preferably shaped matching the curve. The first reinforcing members 122 and the second reinforcing members 124 can closely contact the outer panel 110 if shaped matching the outer panel 110 and preferably can be joined with (bonded with) the outer panel 110.

Figure 2:
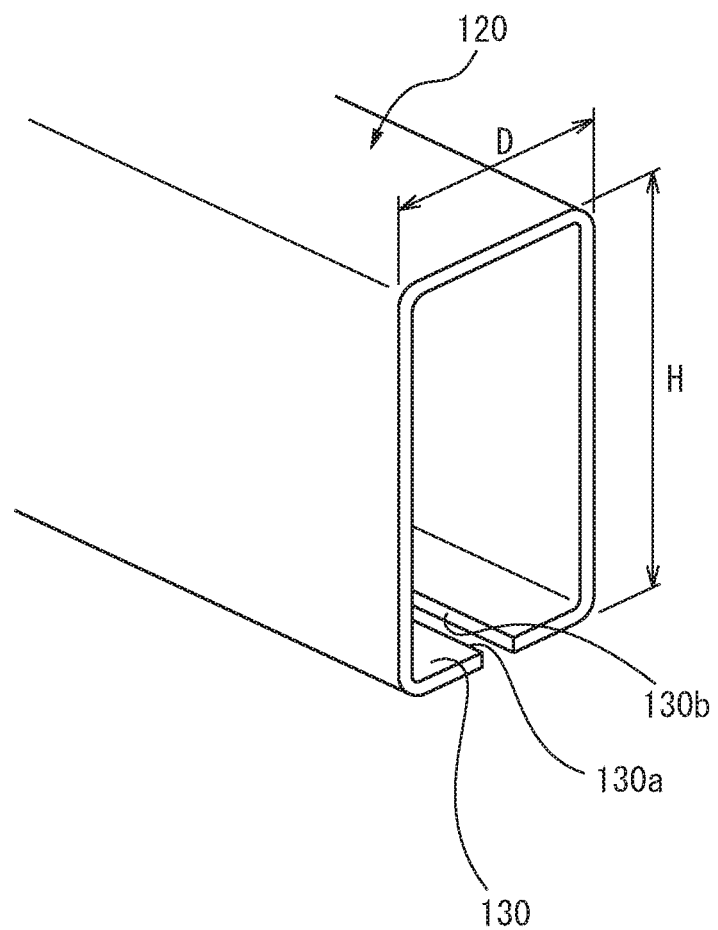
FIG. 2 is a perspective view showing a configuration of a reinforcing member.

FIG. 2 is a perspective view showing the configuration of a reinforcing member 120. The basic configurations of the first reinforcing members 122 and the second reinforcing members 124 can be made the same, but as explained later, either of the first reinforcing members 122 and the second reinforcing members 124 are made higher in rigidity than the other. As one example, the reinforcing member 120 has a hollow box shaped (rectangular shaped) cross-section. The reinforcing member 120 is produced by bending a sheet material 130. In the example shown in FIG. 2, the reinforcing member 120 has a rectangular cross-sectional shape. Among the sides, the long sides are 16 mm or so and the short sides are 10 mm or so. Further, the thickness of the sheet material 130 forming the reinforcing member 120 is, as one example, 0.8 mm or so. As the sheet material 130, a steel sheet can be used.

As shown in FIG. 2, between an end part 130*a* and an end part 130*b* of the bent sheet material 130, a predetermined gap may be provided. On the other hand, the end part 130*a* and the end part 130*b* may also be in close contact. Further, the end part 130*a* and the end part 130*b* may also be joined by welding, bonding, etc. The reinforcing member 120 is arranged so that the surface at which the end parts 130*a* and 130*b* are positioned or the surface at the opposite side to the surface at which the end parts 130*a* and 130*b* are positioned is in close contact with the outer panel 110. Preferably, the surface at which the end parts 130*a* and 130*b* are positioned or the surface at the opposite side to the surface at which the end parts 130*a* and 130*b* are positioned is joined with the outer panel 110.

Here, the surface which is joined with or adjoins the outer panel 110 will be called the "bottom surface". Further, the surface at the opposite side to the bottom surface will be called the "top surface". The surfaces positioned at the two sides of the bottom surface across the ridges will be called the "vertical walls". In the cross-section of the reinforcing member 120, the lower short side is the bottom surface and the long sides are the vertical walls. In a configuration where the end parts 130*a* and 130*b* are arranged at the top surface without being joined, if pushed from the outside direction of the exterior panel 100 and the reinforcing member 120 is curved, the cross-section opens from the end parts 130*a* and 130*b* and the cross-sectional shape easily collapses. However, if the end parts 130*a* and 130*b* are joined, it is possible to prevent the cross-sectional shape from collapsing, so it becomes possible to raise the rigidity of the exterior panel 100 more. Even if the end parts 130*a* and 130*b* are arranged at the bottom surface and the bottom surface is joined with the outer panel 110, it is possible to prevent the end parts 130*a* and 130*b* from separating due to the outer panel 110 and the cross-sectional shape from collapsing.

As shown in FIG. 2, in a horizontal cross-section perpendicular to the longitudinal direction of the reinforcing member 120, if designating a short side of the rectangle as the "width (D)" and a long side as the "height (H)", the reinforcing member 120 has a height H in a direction perpendicular to the surface of the outer panel 110 larger than the width D in a direction along the outer panel 110. Due to this, if an impact load is applied on the exterior panel 100 from the vehicle outer side to the inner side direction, the cross-sectional secondary moment of the reinforcing member 120 can be effectively improved. Further, by the cross-sectional secondary moment of the reinforcing member 120 being improved, the exterior panel 100 according to the present embodiment can be improved in impact resistance performance.

Note that, the cross-sectional configuration of the reinforcing member 120 is not limited to a configuration like in FIG. 2 where the end parts 130*a* and 130*b* face each other. For example, it may also be a groove type (channel) shape where the end parts 130*a* and 130*b* are separated or a hat shape. Further, the reinforcing member 120 may also be configured not from a hollow but a solid member. Regarding the material of the reinforcing member 120, it is also possible to use another metal material other than a steel sheet such as aluminum. A plastic material etc. may also be used.

Figure 3:
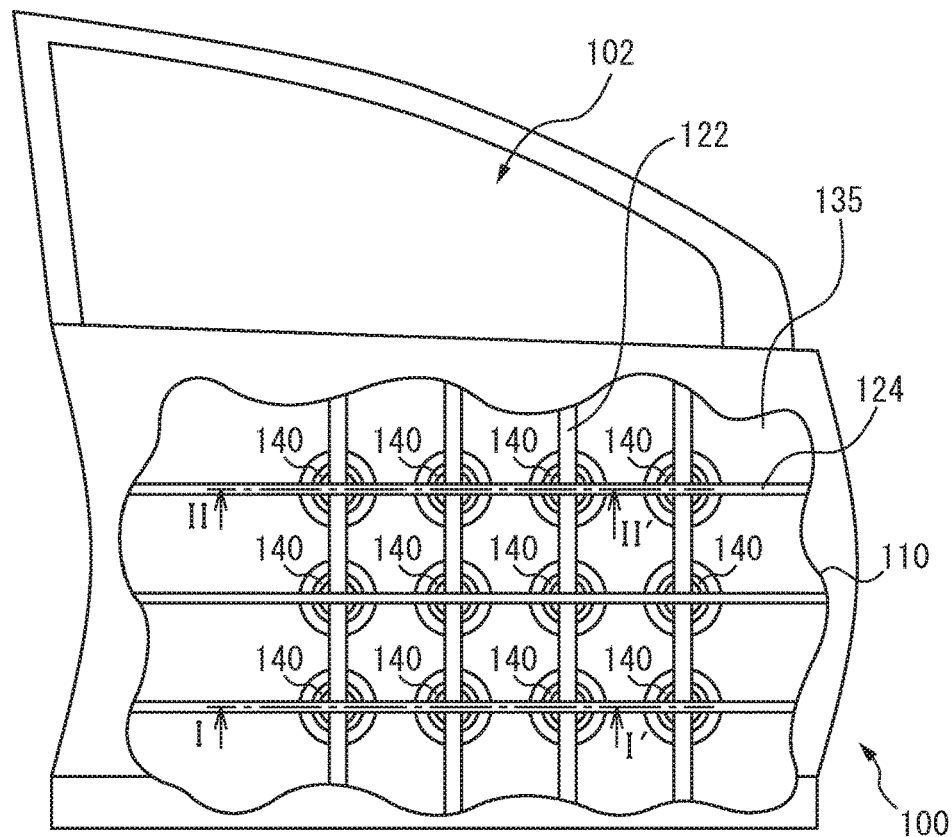
FIG. 3 is a schematic view showing an exterior panel in a state seen from a front side (vehicle outer side of automobile).

FIG. 3 is a schematic view showing the state of the exterior panel 100 seen from the front side. For explanation, in FIG. 3, the outer panel 110 is cut away to show the internal structure of the exterior panel 100. The exterior panel 100 has, in addition to the outer panel 110 and the reinforcing members, support members 140 for supporting the reinforcing members 120 from the vehicle inner side and an inner panel 135.

Figure 4:
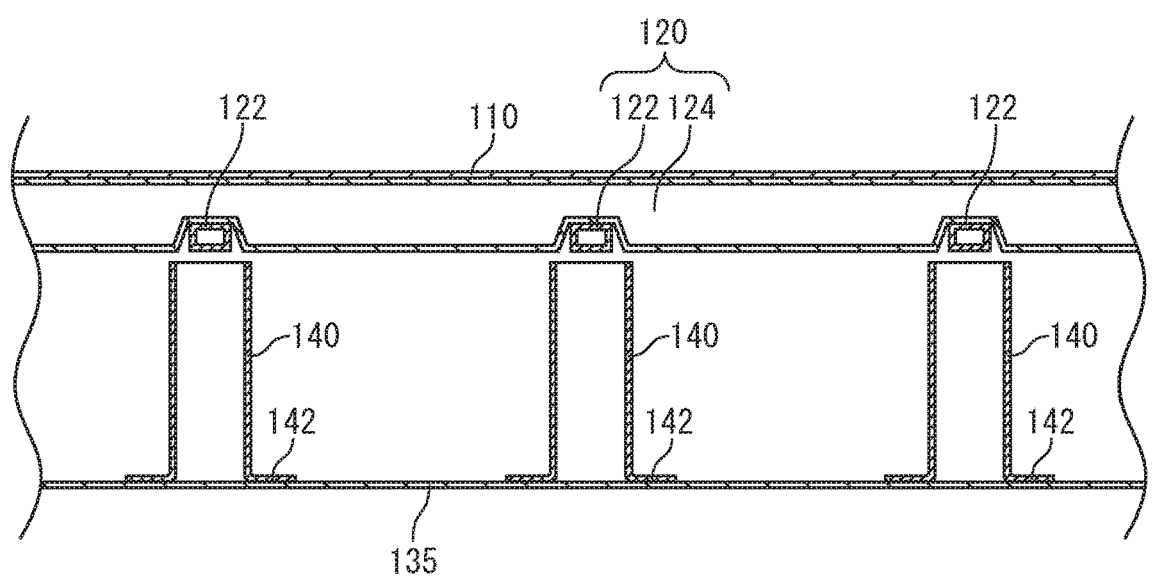
FIG. 4 is a schematic view showing a cross-section along a one-dot chain line I-I in FIG. 3.

FIG. 4 is a schematic view showing a cross-section along the one-dot chain line I-I in FIG. 3. As shown in FIG. 4, in order from the front surface of the exterior panel 100, the outer panel 110, reinforcing members 120, support members 140, and inner panel 135 are arranged in that order. Note that, further inside the inner panel 135, interior parts of the automobile (not shown) are arranged. The end parts of the first reinforcing members 122 and the second reinforcing members 124 are fixed to the inner panel 135 between the outer panel 110 and inner panel 135.

In the example shown in FIG. 3 and FIG. 4, the support members 140 are provided at the crossing parts C of the first reinforcing members 122 and the second reinforcing members 124.

The support members 140 are comprised of tube-shaped members with axial centers running from the front side toward the back side of the exterior panel 100. The support members 140 are welded to the inner panel 135 at flanges 142 provided at the inner panel 135 side.

Note that, in FIG. 3, the support members 140 do not necessarily have to be provided at all of the crossing parts C. The support members 140 may be provided at only some of the crossing parts C among the plurality of the crossing parts C where the first reinforcing members 122 and the second reinforcing members 124 cross. The number of the support members 140 can be suitably set in accordance with the envisioned impact absorption ability of the exterior panel 100.

The end part of a support member 140 at the reinforcing member 120 side is close to or in contact with the surface of a reinforcing member 120 at the back side (vehicle inner side). The support member 140 is not fixed to the reinforcing member 120 but is unconstrained with respect to the reinforcing member 120. Preferably, the end part of the support member 140 at the reinforcing member 120 side and the reinforcing member 120 are separated from each other. A gap is provided between the two. On the other hand, the support member 140 may also be fixed to the reinforcing member 120 by welding etc.

Figure 5:
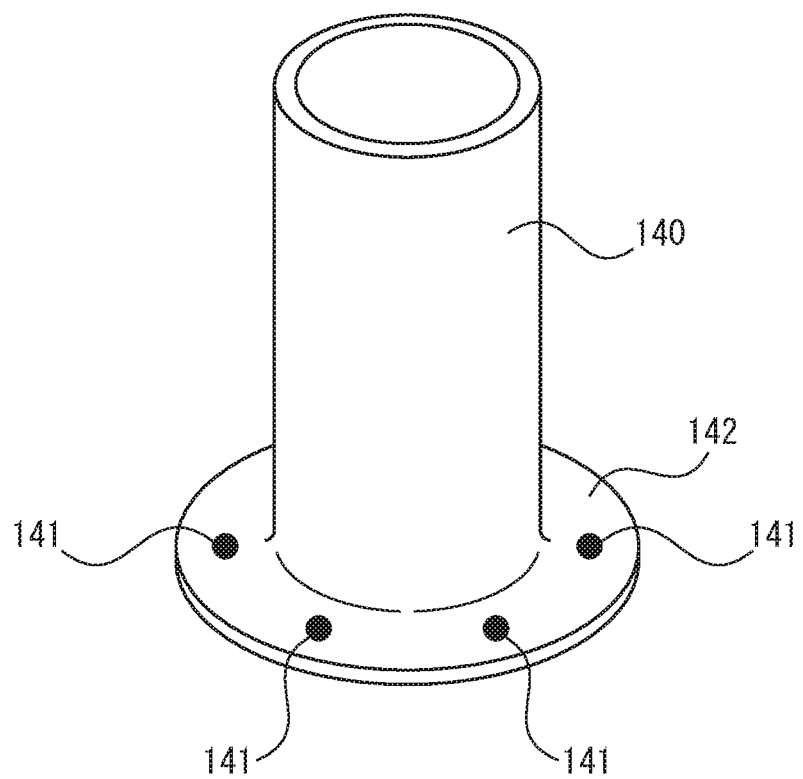
FIG. 5 is a perspective view showing one example of the configuration of a support member.

FIG. 5 is a perspective view showing one example of the configuration of a support member 140. As shown in FIG. 5, the support member 140 is configured in a cylindrical shape and is provided with a flange 142 at one end in the axial center direction. For example, the body of the support member 140 is comprised of a cylindrical pipe. The flange 142 may be configured integrally with the cylindrical body of the support member 140 or may be configured from a separate part joined with the body. The support member 140 is fixed to the inner panel 135 by being welded at the welded part 141 of the flange 142 (spot welding or arc welding). Note that, the support member 140 may also be attached to the inner panel 135 by riveting, bonding, bolting, or other means. The support member 140, like the reinforcing members 120, is comprised of a steel material, aluminum, or other metal material and may be comprised of a plastic material etc.

Figure 6:
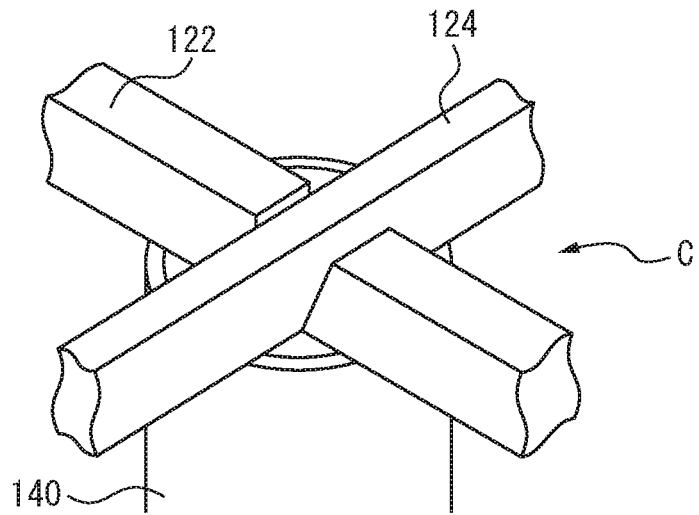
FIG. 6 is a perspective view showing one example of the configuration of a crossing part of a first reinforcing member and a second reinforcing member in FIG. 3.
Figure 7:
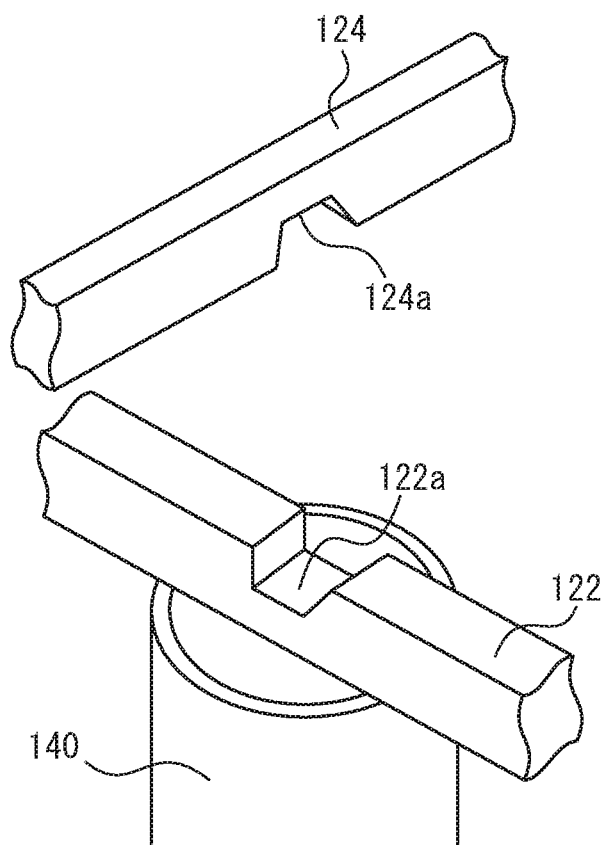
FIG. 7 is a schematic view showing a separated state of a first reinforcing member and a second reinforcing member at a crossing part.

FIG. 6 is a perspective view showing one example of the configuration of a crossing part C of the first reinforcing member 122 and the second reinforcing member 124 in FIG. 3 and shows the state when viewing the crossing part C from the vehicle outer side. Further, FIG. 7 is a schematic view showing the state where the first reinforcing member 122 and the second reinforcing member 124 are separated at the crossing part C. As shown in FIG. 6, at the position of the crossing part C, the second reinforcing member 124 is positioned at the vehicle outer side (outer panel 110 side) with respect to the first reinforcing member 122. Further, as shown in FIG. 7, the first reinforcing member 122 is provided with a recessed part 122a while the second reinforcing member 124 is provided with a recessed part 124a. For this reason, if assembling the first reinforcing member 122 and the second reinforcing member 124 so that the recessed part 122a and the recessed part 124a abut at the crossing part C, the surfaces of the first reinforcing member 122 and the second reinforcing member 124 at the vehicle outer side and the vehicle inner side become generally flush.

In the present embodiment, if an impact load is applied from the vehicle outer side, the roles which the first reinforcing member 122 and the second reinforcing member 124 perform differ. The first reinforcing member 122 and the second reinforcing member 124 differ in rigidity even if the same in thickness due to the differences in lengths at the exterior panel 100 and extents of curvature. For example, if the exterior panel 100 is a door panel, since a door panel is usually a shape laterally long in the horizontal direction, the first reinforcing member 122 is shorter than the second reinforcing member 124. Therefore, if considering the first reinforcing member 122 and the second reinforcing member to be beams with two fixed ends, the shorter length first reinforcing member 122 becomes higher in rigidity if an impact load is applied compared with the longer length second reinforcing member 124. Therefore, for receiving the impact load and absorbing the impact, the first reinforcing member 122 is more suitable than the second reinforcing member 124.

Further, if the first reinforcing member 122 is curved so as to project out to the vehicle outer side matching the curvature of the outer panel 110, if an impact load is applied from the vehicle outer side, the first reinforcing member 122 will be crushed upon receiving compressive force in the longitudinal direction. On the other hand, the second reinforcing member 124, which has little curvature, receives almost no compressive force in the longitudinal direction if an impact load is applied from the vehicle outer side. Therefore, the first reinforcing member 122 is superior in impact resistance performance compared with the second reinforcing member 124 due to being crushed when an impact load is applied.

For this reason, by making the first reinforcing member 122, which is higher in rigidity and more suitable for impact absorption, thicker than the second reinforcing member 124, it is possible to further raise the rigidity of the first reinforcing member 122 and more effectively absorb impact. In other words, by making the first reinforcing member 122 thicker than the second reinforcing member 124, it is possible to make the first reinforcing member 122, which is better in impact resistance performance both in terms of dimensions and shape, the main means for absorption of the impact load.

Note that, the first reinforcing member 122 being "thicker" than the second reinforcing member 124 means the first reinforcing member 122 being larger than the second reinforcing member 124 in the area at the inside from the contour of the member in the cross-section (transverse section) perpendicular to the longitudinal direction of the first reinforcing member 122 or second reinforcing member 124. For example, if the transverse section of the first reinforcing member 122 and second reinforcing member 124 is a hollow rectangular shape such as shown in FIG. 2, the first reinforcing member 122 being "thicker" than the second reinforcing member 124 means the first reinforcing member 122 being larger than the second reinforcing member 124 in the area expressed by D×H shown in FIG. 2.

Alternatively, if the transverse section of the first reinforcing member 122 and second reinforcing member 124 is a hollow rectangular shape such as shown in FIG. 2, the first reinforcing member 122 being "thicker" than the second reinforcing member 124 means the first reinforcing member 122 being larger than the second reinforcing member 124 in one or both of the width D or height H shown in FIG. 2.

On the other hand, the second reinforcing member 124 has the function of transferring an impact load applied to the exterior panel 100 from the outside to the first reinforcing member 122. For this reason, in the example of the configuration shown in FIG. 3 and FIG. 4, at the crossing part C, the second reinforcing member 124 is positioned further at the vehicle outer side than the first reinforcing member 122.

Therefore, if an impact load is applied to the exterior panel 100 from the vehicle outer side, the impact load is first transferred from the outer panel 110 to the reinforcing member 120. The reinforcing member 120 arranged adjoining the outer panel 110 receives the impact load. At this time, at the crossing part C, since the second reinforcing member 124 is arranged further at the vehicle outer side than the first reinforcing member 122, the impact load is transferred from the outer panel 110 to the second reinforcing member 124 between the adjacent first reinforcing members 122, then is transferred to the first reinforcing member 122. The first reinforcing member 122 is higher in rigidity than the second reinforcing member 124 and is crushed if an impact load is applied, so it is possible to effectively absorb an impact load by the first reinforcing member 122.

If in the above way forming a reinforcing member 120 by making two reinforcing members cross, the lower rigidity reinforcing member is arranged at the vehicle outer side and the higher rigidity reinforcing member is arranged at the vehicle inner side. Due to this, when an impact load is applied from the vehicle outer side, the impact load is transferred from the lower rigidity reinforcing member to the higher rigidity reinforcing member and the impact load can be reliably absorbed by the higher rigidity reinforcing member. Further, by making the rigidity of the reinforcing member at the vehicle outer side comparatively low, it is possible to provide an exterior panel 100 which maintains the required strength while being made lighter in weight.

Further, in the present embodiment, a support member 140 is provided for supporting a reinforcing member 120 from the vehicle inner side. If a reinforcing member 120 receiving the impact load deforms to the vehicle inner side, the reinforcing member 120 abuts against the end part of the support member 140 at the reinforcing member 120 side and the impact load is transferred to the support member 140. The flange 142 of the support member 140 is fixed to the inner panel 135, so the impact load is absorbed by the support member 140 receiving the impact load being crushed. The support member 140 is a tube-shaped member with an axial center extending from the vehicle outer side to the vehicle inner side, so is easily crushed when receiving an impact load resulting in a higher impact absorption ability.

Therefore, according to the present embodiment, in addition to the absorption of an impact load by the reinforcing member 120, it is possible to absorb an impact load by the support member 140, so the impact resistance performance of the exterior panel 100 can be greatly improved. Note that, as explained above, preferably a gap is provided between the end part of the support member 140 at the reinforcing member 120 side and the reinforcing member 120. Due to this, when an impact load is applied from the vehicle outer side, the impact load is absorbed by the reinforcing member 120 before the reinforcing member 120 abuts against the end part of the support member 140 at the reinforcing member 120 side, then the support member 140 is crushed, whereby the impact load is absorbed. On the other hand, when not providing a gap between the end part of the support member 140 at the reinforcing member 120 side and the reinforcing member 120, the impact load is directly applied to the support member 140. In that case, if the impact load cannot be sufficiently absorbed by the support member 140, there is a possibility of the inner panel 135 deforming to the compartment side. By providing a gap between the end part of the support member 140 at the reinforcing member 120 side and the reinforcing member 120, the empty running distance until the reinforcing member 120 abuts against the end part of the support member 140 is secured and the impact load is absorbed in two stages at both of the reinforcing member 120 and the support member 140, so the inner panel 135 is kept from deforming to the compartment side.

Note that, the thickness of the tube-shaped member of the support member 140 is preferably made a value of an extent whereby the support member 140 is suitably crushed when an impact load is applied.

The support member 140 can be arranged at various positions with respect to the reinforcing member 120. In the example shown in FIG. 3 and FIG. 4, by providing the support member 140 at the crossing part C where the first reinforcing member 122 and the second reinforcing member 124 cross, it is possible to absorb the impact by both the impact absorbing performance at the crossing part C where the first reinforcing member 122 and the second reinforcing member 124 cross and the impact absorbing performance of the support member 140 and raise the impact resistance performance.

Specifically, as explained above, the first reinforcing member 122 mainly absorbs the impact load, but the second reinforcing member 124 passing through the crossing part C also contributes to impact absorption by deforming to the vehicle inner side. Therefore, by providing the support member 140 at the crossing part C, in addition to the impact absorption ability of the first reinforcing member 122 and the second reinforcing member 124 at the crossing part C, impact absorption using the impact absorption ability of the support member 140 becomes possible.

To enable the support member 140 to reliably support the reinforcing member 120, it is important that the end part of the support member 140 at the reinforcing member 120 side reliably support the reinforcing member 120 if an impact load is applied. For this reason, in the present embodiment, a predetermined relationship is given between the width of the support member 140 and the width of the reinforcing member 120 so that the end part of the support member 140 at the reinforcing member 122 side always supports the reinforcing member 120.

Figure 8:
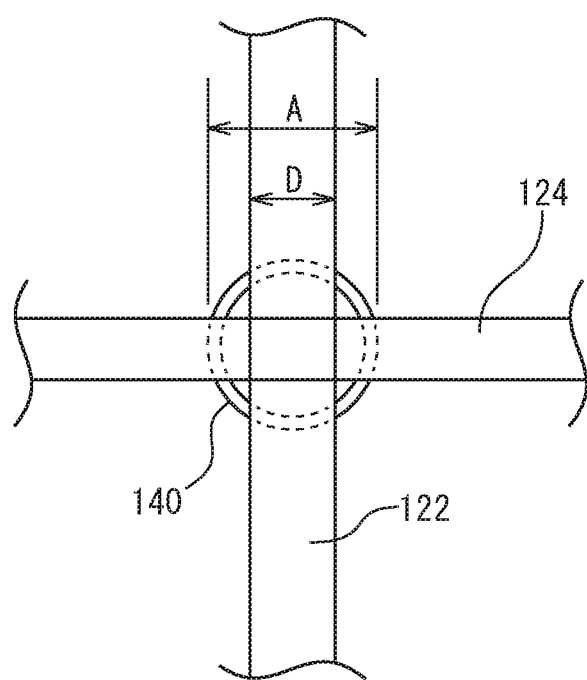
FIG. 8 is a plan view showing a state of a crossing part seen from the vehicle outer side.

FIG. 8 is a plan view showing the state of the crossing part C seen from the vehicle outer side. As shown in FIG. 8, a diameter A of the end part of the support member 140 at the reinforcing member 120 side is larger than a width D of the first reinforcing member 122 or second reinforcing member 124, preferably is made 2 times or more the width D. By making the diameter A of the support member 140 larger than the width D, it is possible to reliably transfer the impact load from the crossing part C to the support member 140. Further, by making the diameter A 2 times or more of the width D, even if the position of the crossing part C shifts in the vertical direction or horizontal direction along the surface of the outer panel 110 when receiving an impact load, it is possible to reliably transfer the impact load from the crossing part C to the support member 140 without the position of the crossing part C seen in the direction from the vehicle outer side toward the vehicle inner side from leaving the region where the cylinder of the support member 140 is present. Note that, as explained later, if configuring the support member 140 by a polygonal tube or hexagonal tube etc., it is configured so that the outer dimension (maximum width) of the end part of the support member 140 at the reinforcing member 120 side seen in the direction from the vehicle outer side toward the vehicle inner side becomes larger than the width D of the first reinforcing member 122 or second reinforcing member 124, preferably 2 times or more of the width D.

Figure 9:
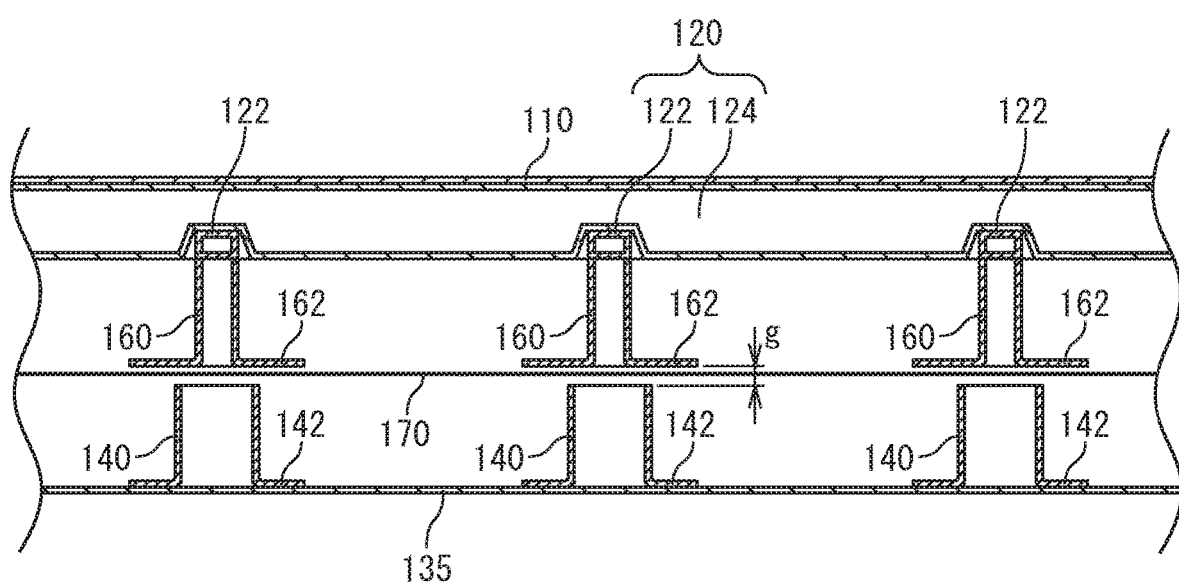
FIG. 9 is a schematic view showing a cross-section along a one-dot chain line II-II at FIG. 3.

Next, the configuration for preventing interference between the support member 140 and window glass 170 will be explained. FIG. 9 is a schematic view showing a cross-section along the one-dot chain line II-II in FIG. 3. In FIG. 3, the window 102 provided at the exterior panel 100 is provided with a window glass 170. By the window glass 170 descending, the window 102 opens.

When the window glass 170 descends, the bottom end of the window glass 170 does not reach the position of the one-dot chain line I-I' in FIG. 3. Therefore, at the position of the one-dot chain line I-I', the window glass 170 does not interfere with the support member 140 so a structure preventing interference between the support member 140 and the window glass 170 becomes unnecessary.

On the other hand, when the window glass 170 descends, the window glass 170 reaches the position of the one-dot chain line II-IF of FIG. 3. The support member 140 is provided between the reinforcing member 120 and the inner panel 135. There is space for the window glass 170 to pass when the window glass 170 descends between the reinforcing member 120 and the inner panel 135. For this reason, at the position of the one-dot chain line a structure where the window glass 170 does not interfere with the support member 140 becomes necessary.

For this reason, the structure is made one making the length of the support members 140 at the position of the one-dot chain line II-IF shorter than the length at the position of the one-dot chain line I-I' and thereby preventing the window glass 170 from interfering with the support members 140 when making the window glass 170 descend.

As shown in FIG. 9, at the position of the one-dot chain line the end parts of the support members 140 at the reinforcing member 120 side do not reach the reinforcing members 120 and other support members 160 are provided at the vehicle outer side from the support members 140. The support members 160 are made tube-shaped members similar to the support members 140. They are provided so as to overlap the support members 140 at the positions of the crossing parts C. The support members 160 are fixed to the reinforcing members 120 by welding etc.

The vehicle inner sides of the support members 160 are provided with flanges 162. Further, a gap "g" is provided between the end parts of the support members 140 at the reinforcing member 120 side and the flanges 162 of the support members 160.

As explained above, the support members 140 are fixed to the inner panel 135 at the flanges 142 of the vehicle inner side, the support members 160 are fixed to the reinforcing members 120 at the end parts at the vehicle outer side, and a gap "g" is provided between the support members 140 and the support members 160. According to such a configuration, when the window glass 170 descends, the window glass 170 can enter the gap "g", so it is possible to keep the window glass 170 and the support members from interfering.

Further, if an impact load is applied to the exterior panel 100 from the outside, if the window 102 is closed, if the reinforcing members 120 receiving the impact load deform to the vehicle inner side, the flanges 162 of the support members 160 fixed to the reinforcing members 120 abut against the end parts of support members 140 at the vehicle outer side and the impact load is transferred from the support members 160 to the support members 140. The flanges 142 of the support members 140 are fixed to the inner panel 135, so the support members 160 and the support members 140 receiving the impact load are crushed and thereby the impact load is absorbed. The support members 140 and the support members 160 are tube-shaped members with axial centers extending from the vehicle outer side to the vehicle inner side, so are easily crushed when receiving the impact load and increase the impact absorption ability. Note that, if the window glass 170 descends and the window 102 is opened, the flanges 162 of the support members 160 abut against the end parts of the support members 140 at the vehicle outer side through the window glass 170.

In the above way, according to the configuration of FIG. 9, it is possible to provide the support members 140 and the support members 160 for absorbing the impact load without interference with the window glass 170 even at the position where the window glass 170 descends. Therefore, even at the position where the window glass 170 descends, if an impact load is applied to the exterior panel 100 from the vehicle outer side, it is possible to absorb impact by the support members 140 and the support members 160.

In the configuration shown in FIG. 9, the thicknesses of the support members 160 are formed smaller than the support members 140, and the end parts of the support members 160 at the vehicle inner side are provided with flanges 162. For this reason, if an impact load is applied, the flanges 162 of the support members 160 reliably abut against the end parts of the support members 140 at the vehicle outer side. Note that, the support members 160 are fixed to the reinforcing members 120, so it is not necessary to consider positional offset of the reinforcing members 120 and the support members 160 when an impact load is applied. Therefore, the thickness of the support member 160 can be made smaller than the support members 140.

In FIG. 3 and FIG. 4, the example was shown where the support members 140 were arranged at positions of the crossing parts C where the first reinforcing members 122 and the second reinforcing members 124 cross, but the support members 140 can be provided at various positions and impact resistance performances corresponding to the layout positions can be obtained.

Figure 10:
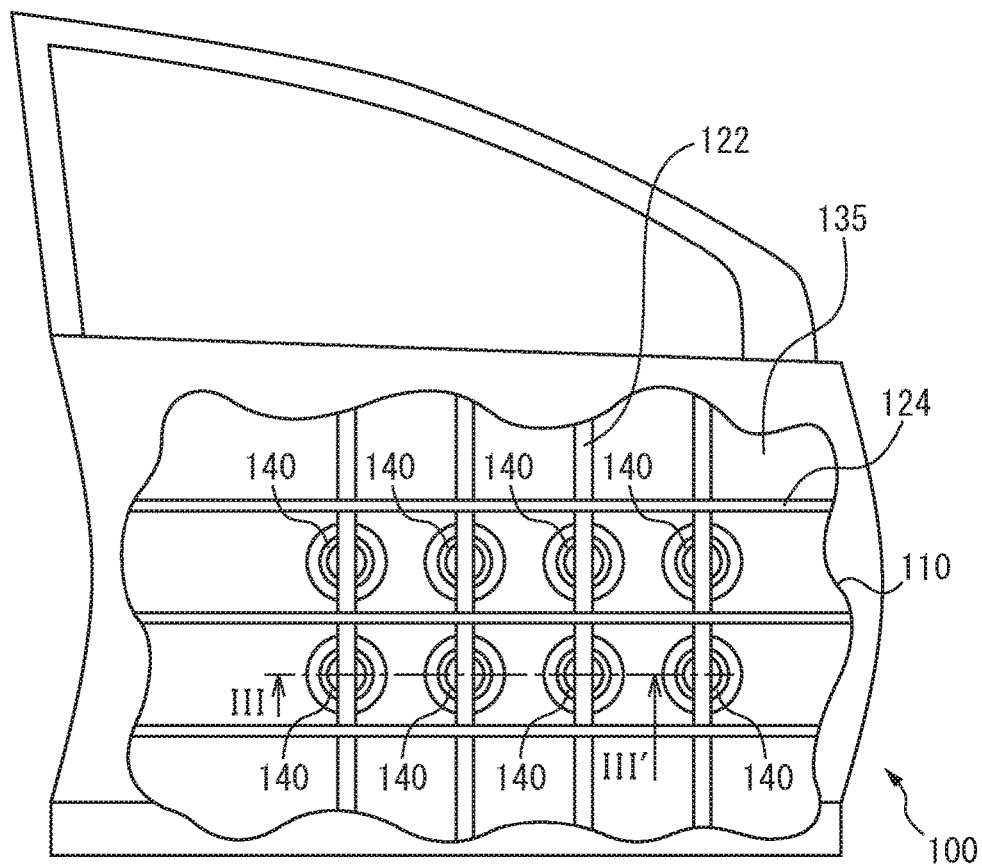
FIG. 10 is a schematic view showing an example of placement of support members 140 so as to support first reinforcing members between two adjoining crossing parts.
Figure 11:
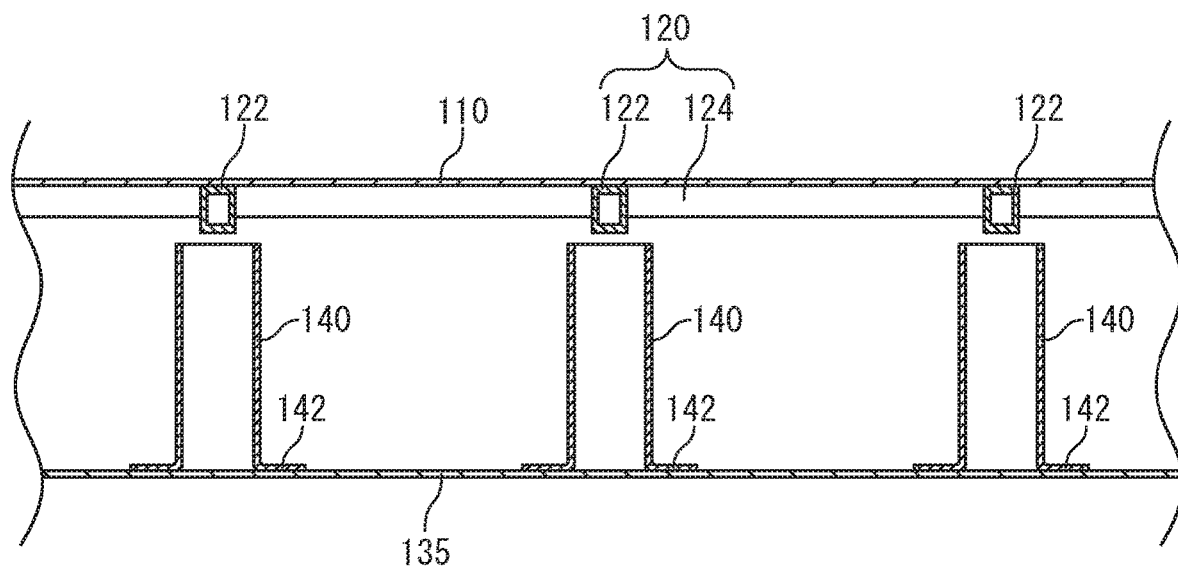
FIG. 11 is a schematic view showing an example of placement of support members 140 so as to support first reinforcing members between two adjoining crossing parts.

FIG. 10 and FIG. 11 show an example of arranging the support members 140 so as to support the first reinforcing members 122 between two adjoining crossing parts C.

FIG. 10, like FIG. 3, shows the exterior panel 100 in a state seen from the front side (vehicle outer side), while FIG. 11 is a schematic view showing a cross-section along the one-dot chain line in FIG. 10.

As shown in FIG. 10, if placing the support members 140 between two adjoining crossing parts C so as to support the first reinforcing members 122, it is possible to raise the impact absorbing performance by the first reinforcing members 122 mainly receiving the impact load if an impact load is applied and the support members 140.

As explained above, the first reinforcing members 122 are made higher in rigidity than the second reinforcing members 124 and mainly have the function of receiving the impact load. On the other hand, the second reinforcing members 124 have the function of transferring impact load from the second reinforcing members 124 to the first reinforcing members 122.

For this reason, by supporting the first reinforcing members 122 configured so as to mainly receive the impact load between two adjoining crossing parts C by the support members 140, it is possible to further raise the rigidity when the first reinforcing members 122 deform. Therefore, it is possible to further raise the impact absorbing performance by the first reinforcing members 122.

Next, an exterior panel 100 raised in impact absorption ability with respect to an impact load in a direction along the outer panel 110 will be explained. For example, in the case like a door panel of an exterior panel 100 extending in the vehicle length direction, by making the second reinforcing members 124 extending in the vehicle length direction thicker, even if an impact load is applied in the vehicle length direction, the exterior panel 100 becomes harder to crush in the vehicle length direction. For this reason, by reversing the thicknesses of the first reinforcing members 122 and the second reinforcing members 124 and making the second reinforcing members 124 thicker than the first reinforcing members 122, it is possible to better improve the impact absorption ability if an impact load is applied from the front side of the vehicle. Note that, it may also be configured to making the thickness of only the second reinforcing members 124 greater without reversing the thicknesses of the first reinforcing members 122 and the second reinforcing members 124, but in this case, while it is possible to improve the impact absorption ability in the case where an impact load is applied from the front side of the vehicle, both the first reinforcing members 122 and the second reinforcing members 124 are thick, so the exterior panel 100 ends up increasing in weight.

On the other hand, as explained above, the second reinforcing members 124 are longer than the first reinforcing members 122 and less curved, so the relative rigidity easily becomes lower. Therefore, by just reversing the thicknesses of the first reinforcing members 122 and the second reinforcing members 124, the impact absorption ability ends up falling in the case where an impact load is applied in a direction perpendicular to the surface of the outer panel 110.

For this reason, if making the second reinforcing members 124 thicker than the first reinforcing members 122, it is possible to supplement the rigidity of the second reinforcing members 124 by supporting the second reinforcing members 124 from the vehicle inner side by the support members 140. Due to this, if an impact load is applied perpendicularly to the outer surface of the exterior panel 100, it is possible to receive the impact load mainly by the second reinforcing members 124 which are thicker than the first reinforcing members 122 and possible to receive the impact load by the support members 140. Therefore, by making the second reinforcing members 124 thicker than the first reinforcing members 122 and supporting the second reinforcing members 124 by the support members 140 from the vehicle inner side, it is possible to raise the impact absorption ability for both of the impact load in the horizontal direction along the surface of the outer panel 110 and the impact load in the direction perpendicular to the surface of the outer panel 110.

As explained above, if configuring a reinforcing member 120 by making two reinforcing members cross, the lower rigidity reinforcing member is arranged at the vehicle outer side and the higher rigidity reinforcing member is arranged at the vehicle inner side. That is, among the first reinforcing members 122 and the second reinforcing members 124, the members mainly receiving the impact load are preferably arranged at the vehicle inner side. For this reason, if making the second reinforcing members 124 thicker than the first reinforcing members 122, at the crossing parts C, the second reinforcing members 124 are preferably arranged further to the vehicle inner side than the first reinforcing members 122. Further, when supporting the second reinforcing members 124 by the support members 140, by supporting the second reinforcing members 124 from the vehicle inner side at the crossing parts C where the first reinforcing members 122 and the second reinforcing members 124 cross, at the crossing parts C, it is possible to absorb impact utilizing both the impact absorption ability due to the rigidity of the first reinforcing members 122 and the second reinforcing members 124 and the impact absorption ability by the support members 140.

Figure 12:
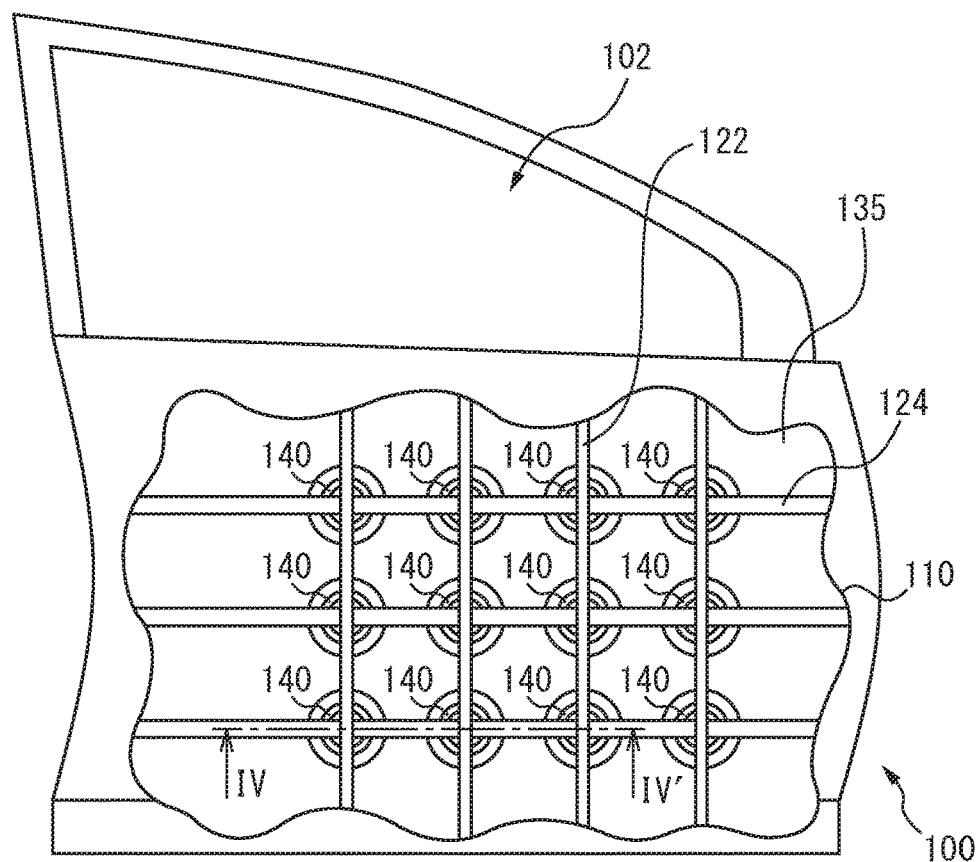
FIG. 12 is a schematic view showing an example of placement of support members 140 so as to support second reinforcing members between two adjoining crossing parts.
Figure 13:
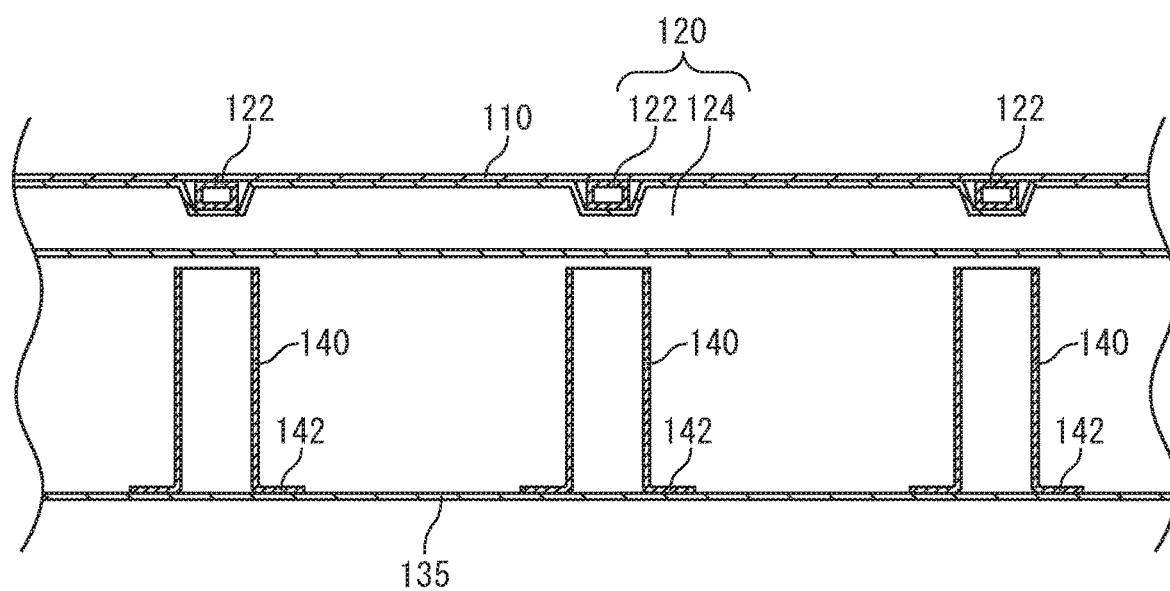
FIG. 13 is a schematic view showing an example of placement of support members 140 so as to support second reinforcing members between two adjoining crossing parts.

From the above viewpoint, FIG. 12 and FIG. 13 show a configuration reversing the thicknesses of the first reinforcing members 122 and the second reinforcing members 124 from the configuration of FIG. 3 and FIG. 4 and making the second reinforcing members 124 thicker than the first reinforcing members 122. Further, in the example shown in FIG. 12 and FIG. 13, at the crossing parts C where the first reinforcing members 122 and the second reinforcing members 124 cross, the second reinforcing members 124 are arranged further to the vehicle inner side than the first reinforcing members 122. Further, in the example shown in FIG. 12 and FIG. 13, the support members 140 are arranged at the crossing parts C where the first reinforcing members 122 and the second reinforcing members 124 cross. FIG. 12, like FIG. 3, shows the exterior panel 100 in the state seen from the front side (vehicle outer side), while FIG. 13 shows a schematic view showing a cross-section along the one-dot chain line IV-IV' in FIG. 12.

As explained above, by making the second reinforcing members 124 thicker than the first reinforcing members 122, it is possible to increase the impact absorption ability with respect to the impact load in a direction along the outer panel 110. Further, by supporting the second reinforcing members 124 by the support members 140, it is possible to supplement the rigidity of the second reinforcing members 124, so it is possible to absorb the impact load in a direction perpendicular to the outer panel 110 by mainly the second reinforcing members 124.

Note that, in the configuration shown in FIG. 12 and FIG. 13, support members 140 were placed at the crossing parts C where the first reinforcing members 122 and the second reinforcing members 124 cross, but the support members 140 may also be placed between the adjoining crossing parts C so as to support the second reinforcing members 124.

Figure 14:
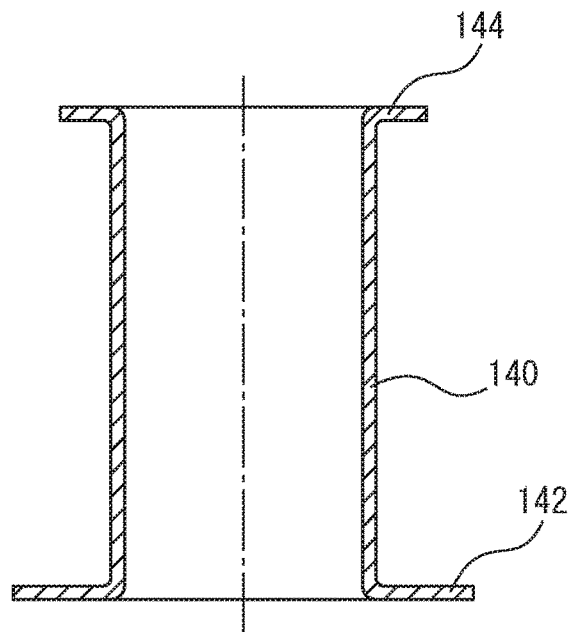
FIG. 14 is a schematic view showing a support member provided with a flange at an end part at a reinforcing member side.
Figure 15:
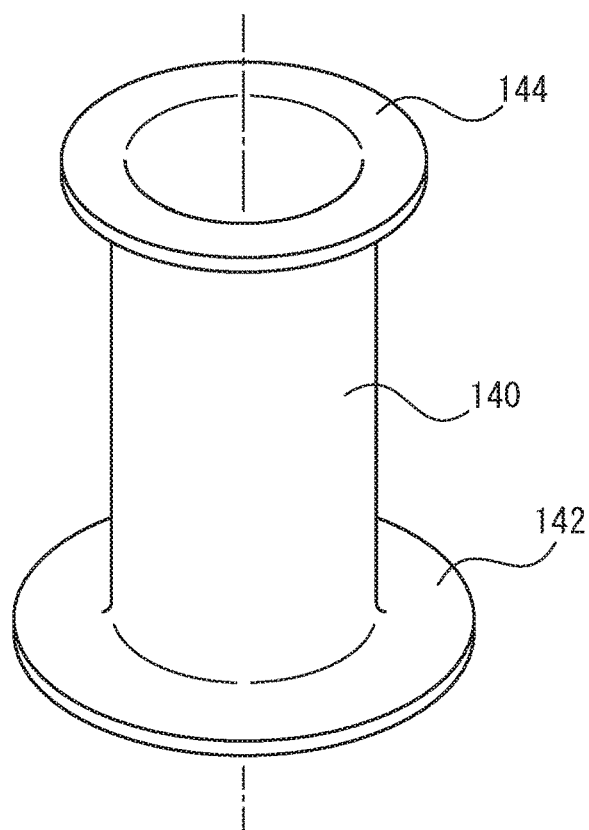
FIG. 15 is a schematic view showing a support member provided with a flange at an end part at a reinforcing member side.

Next, variations of the structure of the support members 140 will be explained. The support members 140 can be made various structures with tube-shaped members as the basic structures. FIG. 14 to FIG. 19 are schematic views showing variations in the shapes of the support members 140. FIG. 14 is a schematic cross-sectional view showing a support member 140 with a flange 144 facing the reinforcing member 120 provided at an end part at the reinforcing member 120 side and shows a cross-section along the axial center of the support member 140. Further, FIG. 15 is a perspective view showing the support member 140 shown in FIG. 14. As shown in FIG. 14 and FIG. 15, a flange 144 is provided at the end part at the opposite side from the flange 142 as well. The flange 144, like the flange 142, may be configured integrally with the tubular body of the support member 140 or may be configured from a separate part joined with the body.

According to the configuration shown in FIG. 14 and FIG. 15, if an impact load is applied to the exterior panel 100, it is possible to receive the reinforcing member 120 at the flat surface of the flange 144, so it is possible to more stably support the reinforcing member 120.

Further, according to the configuration shown in FIG. 14 and FIG. 15, by providing the flange 144 at the end part of the support member 140 on the reinforcing member 120 side, the region supporting the reinforcing member 120 becomes broader. Therefore, if an impact load is applied from outside of the exterior panel 100, even if the position of the crossing part C shifts in the vertical direction or horizontal direction along the surface of the outer panel 110 when receiving the impact load, the position of the crossing part C will not leave the region of the flange 144 and the impact load can be reliably transferred from the crossing part C to the support member 140.

Figure 16:
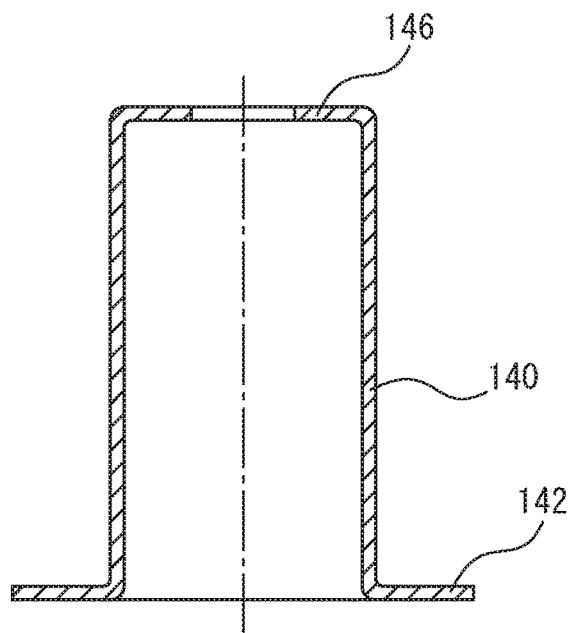
FIG. 16 is a schematic view showing a support member with an end part at a reinforcing member side bent toward an axial center and formed with a surface 146 at a reinforcing member side.
Figure 17:
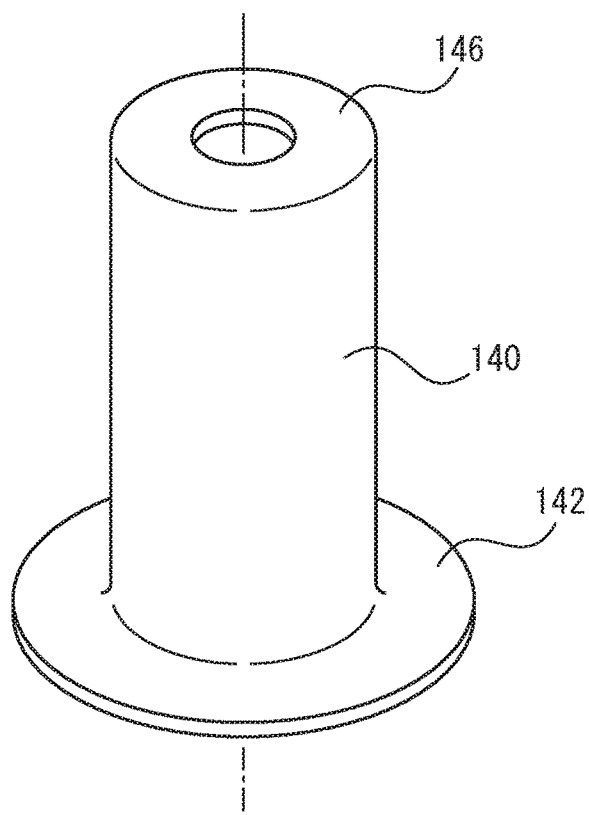
FIG. 17 is a schematic view showing a support member with an end part at a reinforcing member side bent toward an axial center and formed with a surface at a reinforcing member side.

FIG. 16 is a schematic cross-sectional view showing a support member 140 with an end part at the reinforcing member 120 side extending toward the axial center and formed with a surface 146 facing a reinforcing member 120 at the reinforcing member 120 side. Further, FIG. 17 is a perspective view showing the support member 140 shown in FIG. 16. In the support member 140 shown in FIG. 16 and FIG. 17 as well, due to the formation of the surface 146, when an impact load is applied to the exterior panel 100, it is possible to receive the reinforcing member 120 at the surface 146, so it is possible to more stably support the reinforcing member 120.

Figure 18:
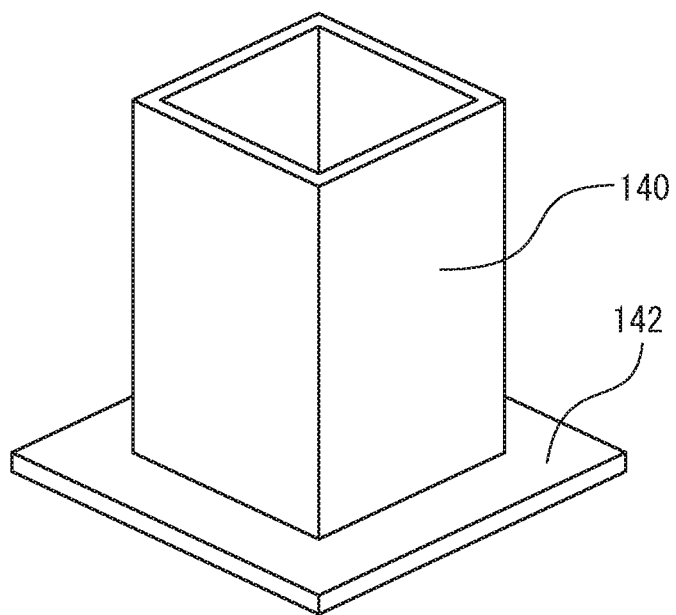
FIG. 18 is a perspective view showing an example of configuration of a support member from a polygonal tube.
Figure 19:
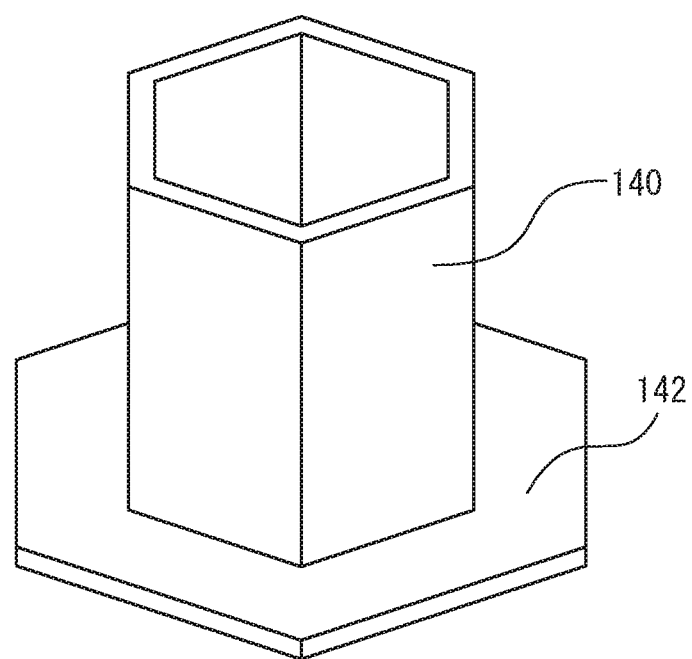
FIG. 19 is a perspective view showing an example of configuration of a support member from a hexagonal tube.

FIG. 18 is a perspective view showing an example of configuring the support member 140 from a polygonal tube. Further, FIG. 19 is a perspective view showing an example of configuring the support member 140 from a hexagonal tube. In this way, the shape of the support member 140 is not limited to a cylinder. Various tubular shapes can be employed. In particular, if configuring the support member 140 from a hexagonal tube, it is possible to obtain a higher impact absorption ability with respect to compression in the axial center direction. The tube-shaped members of the support members 140 shown in FIG. 18 and FIG. 19 can, for example, be produced by roll forming, press braking, or other technique.

Figure 20:
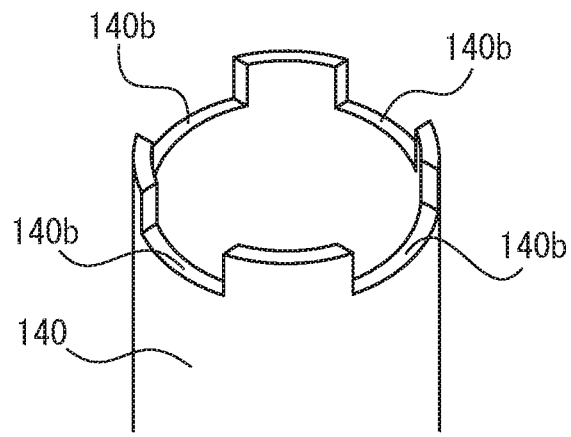
FIG. 20 is a perspective view showing a support member provided with recessed parts corresponding to the shapes of reinforcing members.
Figure 21:
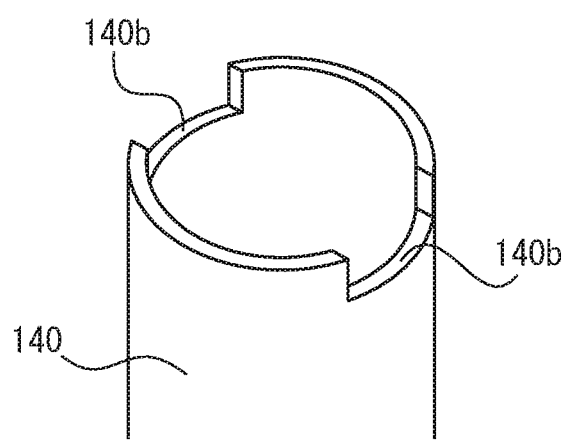
FIG. 21 is a perspective view showing a support member provided with recessed parts corresponding to the shapes of reinforcing members.

Next, a configuration providing a support member with a position restricting part restricting the position of the reinforcing member will be explained with reference to an example of a case of a support member with a cylindrical shape. As shown in FIG. 20 to FIG. 23, an end part of the support member 140 at the reinforcing member 120 side is provided with recessed parts 140b corresponding to the shapes of the reinforcing members 120. The recessed parts 140b are formed to depths corresponding to the lengths of the reinforcing members 120 in the vehicle inner-outer direction. In the present embodiment, the depths of the recessed parts 140b are made depths about 10% shorter than the lengths of the reinforcing members 120 in the vehicle inner-outer direction. The surface of the reinforcing member 120 positioned at the outermost side in the vehicle inner-outer direction is positioned at the outer side in the vehicle inner-outer direction from the top end of the support member 140. The surface of the reinforcing member 120 positioned at the innermost side in the vehicle inner-outer direction abuts against the bottom part of the recessed part 140b. Note that a gap may be provided between the surface of the reinforcing member 120 positioned at the innermost side in the vehicle inner-outer and the bottom part of the recessed part 140b. FIG. 20 and FIG. 21 are perspective views showing support members 140 at which recessed parts 140b corresponding to the shapes of the reinforcing members 120 are provided.

FIG. 20 shows a support member 140 arranged at a crossing part C of a first reinforcing member 122 and a second reinforcing member 124. As shown in FIG. 20, at the end part of the support member 140 at the reinforcing member 120 side, four recessed parts 140b corresponding to the first reinforcing member 122 and the second reinforcing member 124 to be arranged at the crossing part C are provided.

Further, FIG. 21 shows a support member 140 arranged between two adjoining crossing parts C. The support member shown in FIG. 21 corresponds to a support member 140 arranged at a position shown in FIG. 10. As shown in FIG. 21, at the end part of the support member 140 at the reinforcing member 120 side, two recessed parts 140b corresponding to a first reinforcing member 122 are provided.

Figure 22:
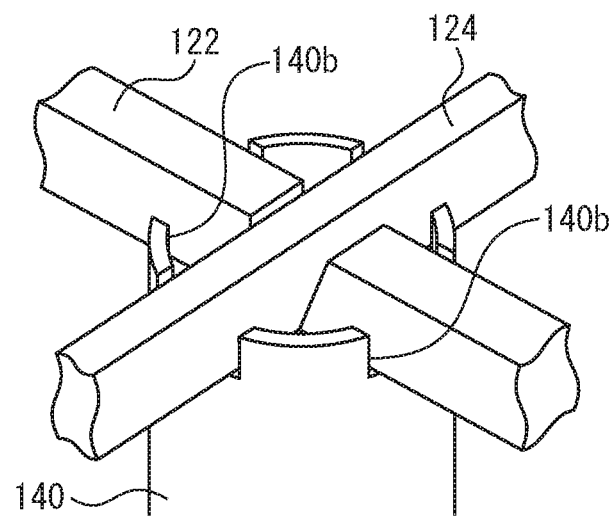
FIG. 22 is a perspective view showing a state where a support member 140 shown in FIG. 20 is arranged at a crossing part where a first reinforcing member 122 and a second reinforcing member 124 cross.

FIG. 22 is a perspective view showing the state where the support member 140 shown in FIG. 20 is arranged at a crossing point C where a first reinforcing member 122 and a second reinforcing member 124 cross. As shown in FIG. 22, the first reinforcing member 122 and the second reinforcing member 124 enter into the recessed parts 140b of the support member 140. Therefore, if an impact load is applied to the exterior panel 100, the support member 140 and the first reinforcing member 122 and second reinforcing member 124 are kept from becoming offset in position relative to each other and the impact load is reliably transferred from the crossing part C to the support member 140.

Figure 23:
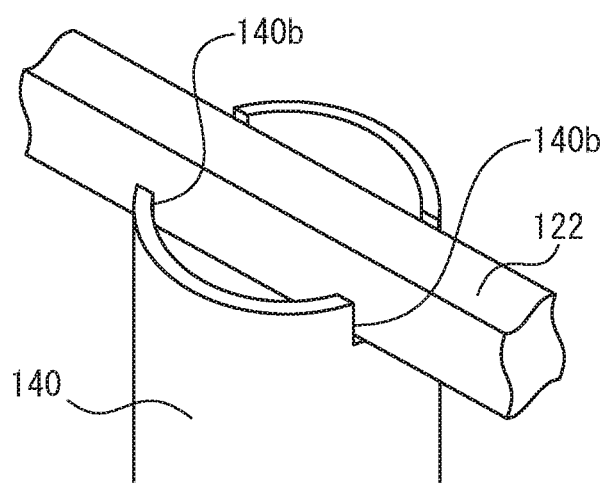
FIG. 23 is a perspective view showing a state where a support member 140 shown in FIG. 21 is arranged at a position shown in FIG. 10.

Further, FIG. 23 is a perspective view showing the state where the support member 140 shown in FIG. 21 is arranged at a position shown in FIG. 10. As shown in FIG. 23, the first reinforcing member 122 enters into the recessed parts 140b of the support member 140. Therefore, if an impact load is applied to the exterior panel 100, the support member 140 and the first reinforcing member 122 are kept from becoming offset in position relative to each other and the impact load is reliably transferred from the crossing part C to the support member 140.

Next, based on FIG. 24 to FIG. 28, the configurations of support members 140 provided with partition members will be explained. The examples of configuration shown in FIG. 24 to FIG. 28 are ones of provision of partition members 150 inside the support members 140 arranged in the axial center directions and using the partition members 150 to partition the tube-shaped members of the support members 140 into pluralities of sections.

By providing partition members 150 arranged in the axial center direction, when an impact load is applied to the exterior panel 100 from the outside and the impact load is applied to the support member 140 through the outer panel 110 and the reinforcing member 120, the partition members 150 are crushed. Therefore, by providing the partition members 150, the support member 140 becomes more resistant to being crushed in the axial center direction, so the impact absorption ability of the support member 140 is improved more. Further, by providing a plurality of thin partition members 150, it is possible to lighten the weight while raising the impact absorption ability of the support member 140, so it is possible to secure the necessary strength and, further, keep down the weight of the support member 140.

Figure 24:
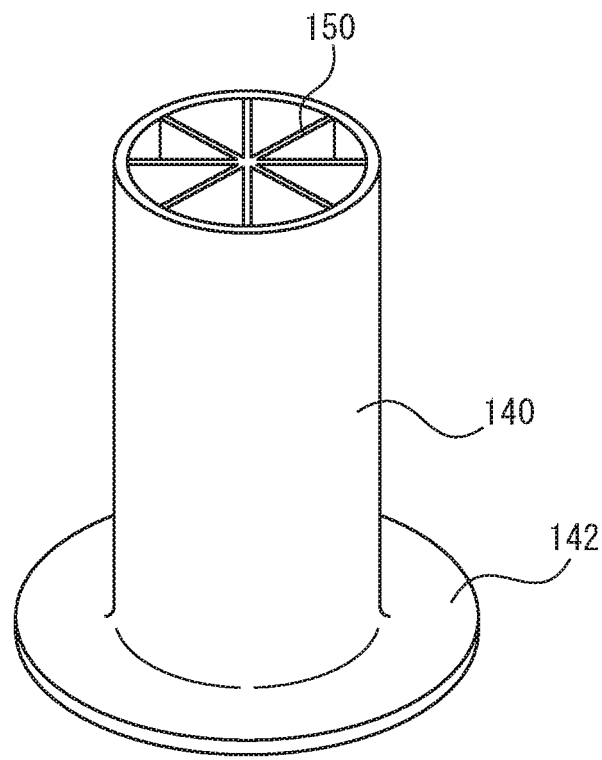
FIG. 24 is a schematic view showing a configuration where a support member is provided with partition members.
Figure 25:
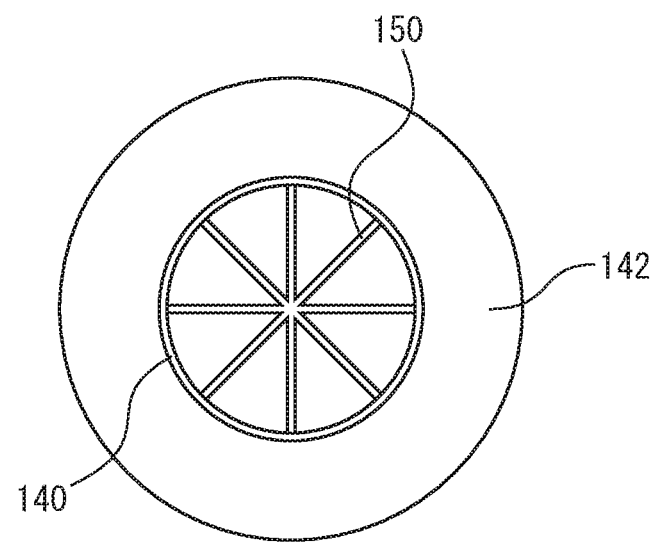
FIG. 25 is a schematic view showing a configuration where a support member is provided with partition members.

FIG. 24 is a perspective view showing a support member 140 provided with partition members 150. Further, FIG. 25 is a plan view of the support member 140 shown in FIG. 24 seen from the direction of the axial center. In the example of FIG. 24 and FIG. 25, eight partition members 150 are provided at intervals of 45° angle about the axial center of the cylinder of the support member 140.

Figure 26:
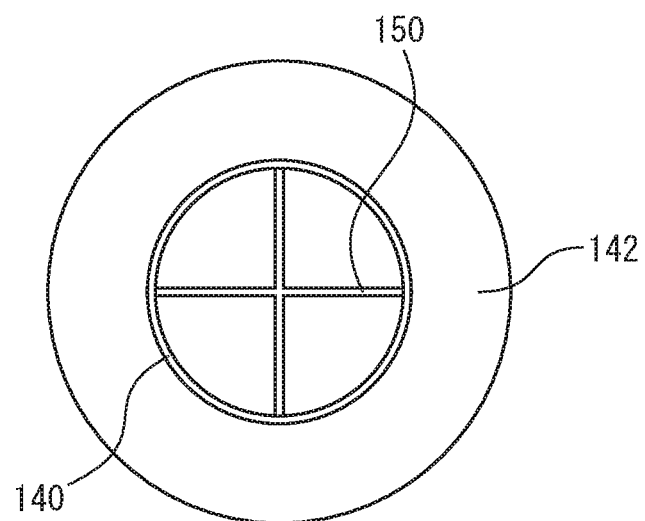
FIG. 26 is a schematic view showing a configuration where a support member is provided with partition members.
Figure 27:
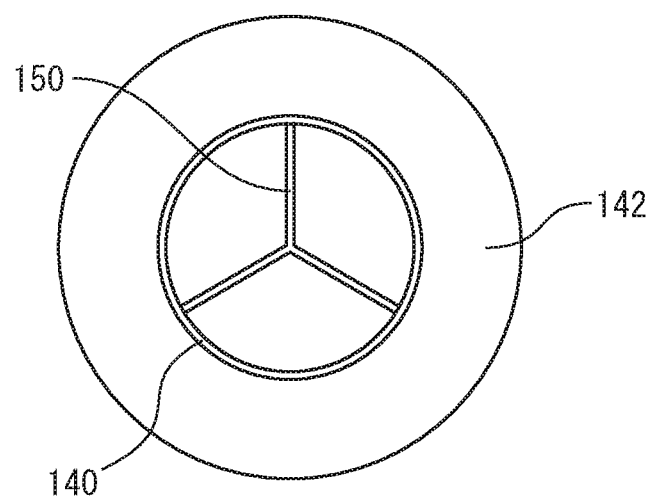
FIG. 27 is a schematic view showing a configuration where a support member is provided with partition members.

Further, FIG. 26 and FIG. 27 are schematic views showing other examples of support members 140 provided with partition members 150 and plan views of the support members 140 seen from the axial center direction. FIG. 26 shows an example of provision of four partition members 150 at intervals of 90° angle about the axial center of the cylinder of the support member 140, while FIG. 27 shows an example of provision of three partition members 150 at intervals of 120° angle about the axial center.

In all of the examples of FIG. 24 to FIG. 27 as well, it is possible to raise the impact absorption ability of the support members 140, but the greater the number of the partition members 150, the higher the rigidity becomes in the direction in which the impact load is applied, so the impact absorption ability becomes higher.

Figure 28:
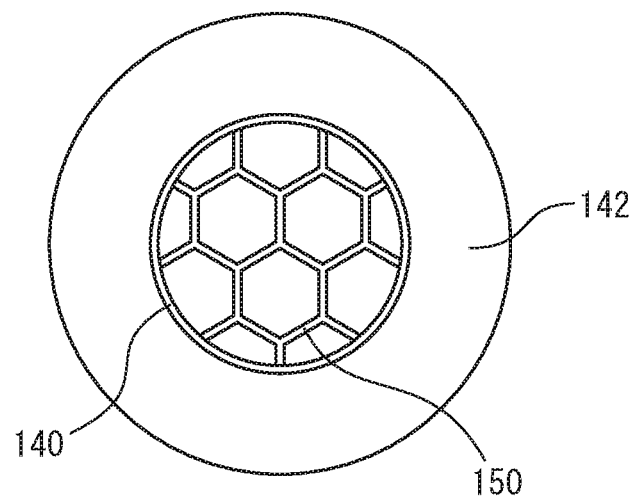
FIG. 28 is a schematic view showing a configuration where a support member is provided with partition members.

Further, FIG. 28 is a schematic view showing another example of a support member 140 provided with partition members 150 and a plan view of the support member 140 seen from the axial center direction. FIG. 28 shows an example of placement of partition members 150 in a honeycomb structure. According to the example shown in FIG.

28, it is possible to place a greater number of partition members 150, so it is possible to further raise the impact absorption ability.

In the above-mentioned examples, in each case, the support member 140 was explained as a structure having a tubular shaped part, but the support member 140 may also be a structure other than a tubular shape.

Figure 29:
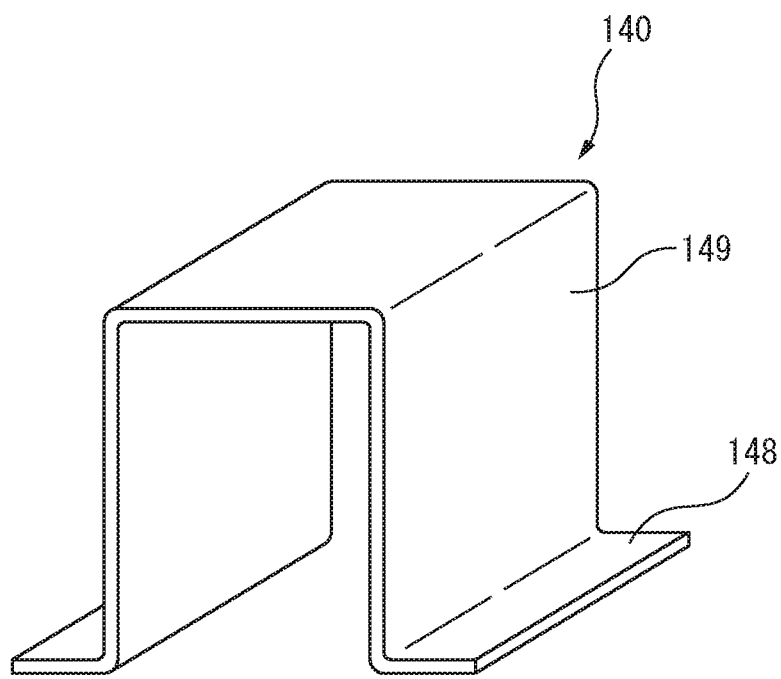
FIG. 29 is a schematic view showing an example where a support member is configured from a hat-shaped member.

FIG. 29 is a schematic view showing an example of configuring the support member 140 from a hat-shaped member. As shown in FIG. 29, the support member 140 need not be made a tube-shaped member and can be configured as a hat shape. In a hat-shaped support member 140 as well, the flanges 148 are fixed to the inner panel 135 by welding etc. Further, in the case of a hat-shaped support member 140, if an impact load is applied to the exterior panel 100 from the outside, the impact load is absorbed by side walls 149 being crushed.

Figure 30:
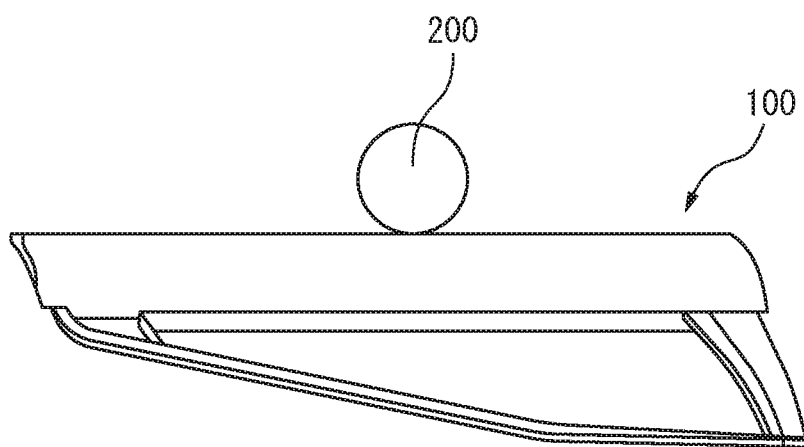
FIG. 30 is a schematic view for explaining a comparison and evaluation of an impact absorption ability at the time of impact from a vehicle side surface for a tube-shaped structure support member and a hat-shaped support member.
Figure 31:
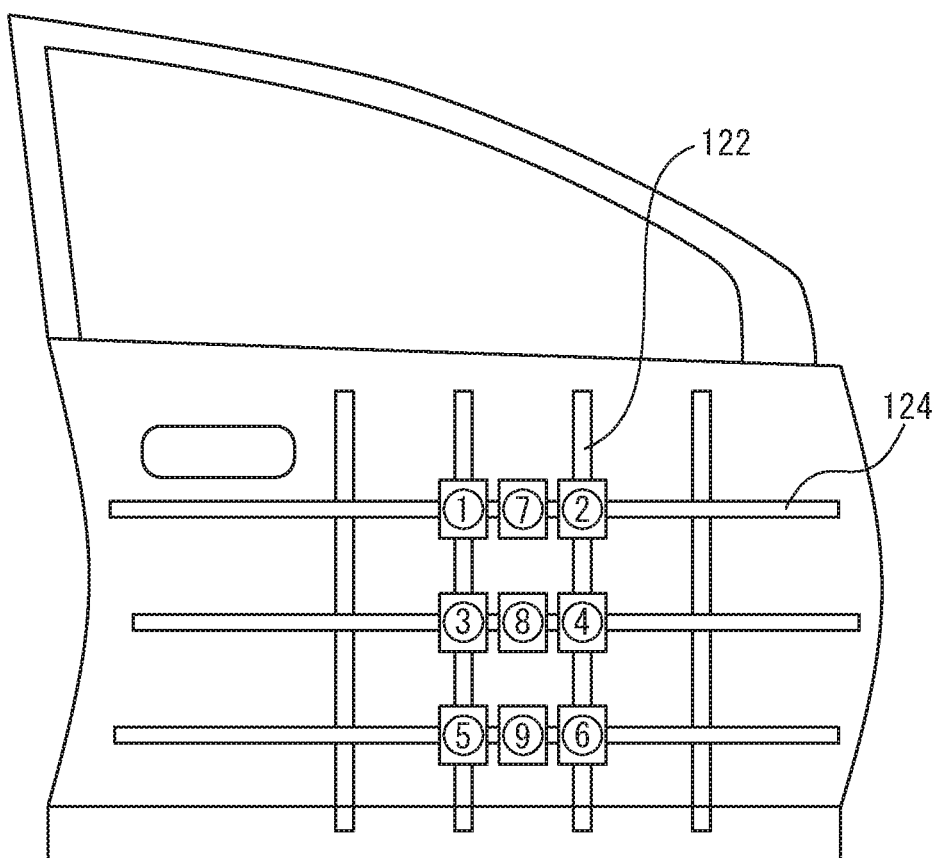
FIG. 31 is a schematic view for explaining a comparison and evaluation of an impact absorption ability at the time of impact from a vehicle side surface for a tube-shaped structure support member and a hat-shaped support member.

FIG. 30 and FIG. 31 are schematic views for explaining the results of comparison and evaluation of impact absorption abilities at the time of impact (side impact) from the vehicle side surface for tube-shaped member support members 140 and hat-shaped support members 140.

In this evaluation, as shown in FIG. 30, a diameter 254 mm pole-shaped indenter 200 was made to strike a door panel as an exterior panel 100 perpendicularly by a constant speed of 20 km/h. The absorption energy until an amount of displacement of the indenter 200 of 70 mm was measured. This evaluation envisions a case of telephone pole or other structure striking a door panel of a vehicle from a side surface. The shape of the indenter 200 is made a pole shape envisioning a telephone pole. Further, EA values were found for the cases making the support members 140 tube-shaped members and the cases making the support members 140 hat shapes. An "EA value" is the value of the absorption energy when providing a support member 140 divided by the absorption energy of a comparative example when not providing a support member 140. The EA values were found for the cases making the support members 140 tube-shaped members and the cases making the support members 140 hat shapes and the performance ratios of tube-shaped members with respect to hat shapes were calculated.

At that time, the support members 140 were placed at the positions of 1 to 9 shown in FIG. 31. Cases of placing the support members 140 at one or more positions were evaluated. The following Table 1 shows the nos. of the placement positions of the support member 140 and results of the performance ratios of pipes with respect to hats.

For example, under the conditions of No. 5 of Table 1, support members 140 were placed at the four locations of 1, 2, 5, and 6 shown in FIG. 31 and the indenter 200 was made to strike the exterior panel 100. In this case, the performance ratio of the tube-shaped members (pipe) with respect to the hat shape was 1.02. Therefore, when placing the support members 140 at the four locations of 1, 2, 5, and 6 of FIG. 30, the result was a higher impact absorption ability with a tube-shaped member than a hat shape.

TABLE 1

| Class | No. | Placement nos. of intermediate support members | EA performance ratio (pipe/hat) |
|---|---|---|---|
| Examples | 1 | 1, 2 | 1.01 |
| | 2 | 3, 4 | 1.01 |
| | 3 | 5, 6 | 1.05 |
| | 4 | 1, 2, 3, 4 | 1.00 |
| | 5 | 1, 2, 5, 6 | 1.02 |
| | 6 | 3, 4, 5, 6 | 1.01 |

TABLE 1-continued

| Class | No. | Placement nos. of intermediate support members | EA performance ratio (pipe/hat) |
|---|---|---|---|
| | 7 | 1, 2, 7 | 1.02 |
| | 8 | 3, 4, 8 | 1.02 |
| | 9 | 5, 6, 9 | 1.04 |
| | 10 | 7, 8, 9 | 1.01 |
| | 11 | 1 | 1.08 |
| | 12 | 2 | 1.01 |
| | 13 | 3 | 1.02 |
| | 14 | 4 | 1.02 |
| | 15 | 5 | 1.07 |
| | 16 | 6 | 1.04 |
| | 17 | 7 | 1.01 |
| | 18 | 8 | 1.03 |
| | 19 | 9 | 1.03 |

As shown in Table 1, in all of the conditions of 1 to 19, better results were obtained in the EA values of the tube-shaped members than hat shapes. From this, it will be understood that in the case of a tube-shaped member support member 140, the support member 140 is crushed and impact is effectively absorbed in the direction in which the impact load is applied. Further, in the case of a tube-shaped member support member 140, there is greater resistance to deformation in a specific direction compared with a hat-shaped support member 140, so impact can be reliably absorbed. Therefore, an impact load can be absorbed even by a hat-shaped support member 140, but making the member a tube shape rather than a hat shape enables the impact absorption ability of the support member 140 to be raised more. Further, by arranging the above-mentioned partition members 150 inside of the pipe, the impact absorption ability can be further raised by the partition members 150 being crushed when an impact load is applied.

As explained above, according to the present embodiment, by providing the support members 140 supporting the reinforcing members 120 from the vehicle inner side, when an impact load is applied to the exterior panel 100 from the vehicle outer side, it is possible to raise the rigidity of the exterior panel 100 and possible to improve the impact absorption ability. Further, by configuring the support members 140 from tube-shaped members with axial centers facing directions in which impact load is applied, the tube-shaped members are crushed upon receiving an impact load, so it is possible to absorb impact more efficiently.

REFERENCE SIGNS LIST 100 exterior panel
102 window
110 outer panel
120 reinforcing member
122 first reinforcing member
122a recessed part
124 second reinforcing member
124a recessed part
130 sheet material
135 inner panel
140, 160 support member
141 welded part
142 flange
144 flange
146 surface
148 flange
149 side wall
150 partition member
162 flange 170 window glass
200 indenter

The invention claimed is:

1. A reinforcing structure of an automobile exterior panel comprising:
   an outer panel of a sheet shape,
   a reinforcing member arranged at a vehicle inner side from said outer panel,
   an inner panel of a sheet shape arranged at a vehicle inner side from said reinforcing member, and
   a support member provided at a vehicle outer side from said inner panel and supporting said reinforcing member from a vehicle inner side,
   said support member comprised of a tube-shaped member having an axial center directed from the vehicle inner side toward the vehicle outer side, wherein said support member has a flange provided at an end part at said inner panel side and fixed to said inner panel.

2. A reinforcing structure of an automobile exterior panel comprising:
   an outer panel of a sheet shape,
   a reinforcing member arranged at a vehicle inner side from said outer panel,
   an inner panel of a sheet shape arranged at a vehicle inner side from said reinforcing member, and
   a support member provided at a vehicle outer side from said inner panel and supporting said reinforcing member from a vehicle inner side,
   said support member comprised of a tube-shaped member having an axial center directed from the vehicle inner side toward the vehicle outer side, wherein there are a plurality of said support members.

3. A reinforcing structure of an automobile exterior panel comprising:
   an outer panel of a sheet shape,
   a reinforcing member arranged at a vehicle inner side from said outer panel,
   an inner panel of a sheet shape arranged at a vehicle inner side from said reinforcing member, and
   a support member provided at a vehicle outer side from said inner panel and supporting said reinforcing member from a vehicle inner side,
   said support member comprised of a tube-shaped member having an axial center directed from the vehicle inner side toward the vehicle outer side, wherein said reinforcing member comprises
   a plurality of first members of long shapes extending in a first direction running along said outer panel and
   a plurality of second members of long shapes extending in a second direction running along said outer panel and crossing said first members.

4. The reinforcing structure of an automobile exterior panel according to claim 3, wherein
   said second members are thicker than said first members, and
   said support member supports said first members or said second members at a crossing part where said first members and said second members cross.

5. The reinforcing structure of an automobile exterior panel according to claim 4, wherein an end part of said support member at said reinforcing member side is provided with a recessed part corresponding to said first members and said second members at said crossing part.

6. The reinforcing structure of an automobile exterior panel according to claim 3, wherein
   said second members are thicker than said first members, and
   said support member support said second member between adjoining crossing parts among a plurality of said crossing parts where said first members and said second members cross.

7. The reinforcing structure of an automobile exterior panel according to claim 6, wherein an end part of said support member at said reinforcing member side is provided with a recessed part corresponding to shapes of said second members between adjoining crossing parts.

8. The reinforcing structure of an automobile exterior panel according to claim 3, wherein
   said outer panel is an outer panel at a door of an automobile, and
   said first members extend in a vehicle height direction and said second members extend in a vehicle length direction.

9. The reinforcing structure of an automobile exterior panel according to claim 8, wherein
   said support member has first support members with end parts at the vehicle outer side fixed to said first members or said second members and second support members with end parts at the vehicle inner side fixed to said inner panel, and
   said first support members and said second support members are separated from each other so that a gap is formed for window glass provided at said door to enter.

10. A reinforcing structure of an automobile exterior panel comprising:
    an outer panel of a sheet shape,
    a reinforcing member arranged at a vehicle inner side from said outer panel,
    an inner panel of a sheet shape arranged at a vehicle inner side from said reinforcing member, and
    a support member provided at a vehicle outer side from said inner panel and supporting said reinforcing member from a vehicle inner side,
    said support member comprised of a tube-shaped member having an axial center directed from the vehicle inner side toward the vehicle outer side, wherein a maximum width of an end part of said support member at said reinforcing member side when viewing said support member from a vehicle outer side is larger than a width of said reinforcing member.

11. The reinforcing structure of an automobile exterior panel according to claim 10, wherein the maximum width of the end part of said support member at said reinforcing member side when viewing said support member from a vehicle outer side is 2 times or more of the width of said reinforcing member.

* * * * *